United States Patent
Chauvel et al.

(10) Patent No.: US 6,751,706 B2
(45) Date of Patent: Jun. 15, 2004

(54) MULTIPLE MICROPROCESSORS WITH A SHARED CACHE

(75) Inventors: Gerard Chauvel, Antibes (FR); Maija Kuusela, Mougins (FR); Dominique D'Inverno, Villeneuve-Loubet (FR); Serge Lasserre, Frejus (FR)

(73) Assignee: Texas Instruments Incorporated, Dallas, TX (US)

( * ) Notice: Subject to any disclaimer, the term of this patent is extended or adjusted under 35 U.S.C. 154(b) by 322 days.

(21) Appl. No.: 09/932,651

(22) Filed: Aug. 17, 2001

(65) Prior Publication Data

US 2002/0073282 A1 Jun. 13, 2002

(30) Foreign Application Priority Data

Aug. 21, 2000 (EP) .......................................... 004023313

(51) Int. Cl.$^7$ ................................................ G06F 12/00

(52) U.S. Cl. ........................ 711/122; 711/130; 711/137

(58) Field of Search ................................ 711/122, 130, 711/137

(56) References Cited

U.S. PATENT DOCUMENTS 5,636,364 A  *  6/1997  Emma et al. ................ 711/140
5,809,522 A  *  9/1998  Novak et al. ................ 711/118

FOREIGN PATENT DOCUMENTS

EP      0 442 474 A2    8/1991
EP      0 930 574 A2    7/1999

OTHER PUBLICATIONS

Texas Instruments Incorporated, S/N: 09/591,537, filed Jun. 9, 2000, *Smart Cache*.
Texas Instruments Incorporated, S/N: 09/187,118, filed Nov. 5, 1998, *Computer Circuits, Systems, and Methods Using Partial Cache Cleaning*.
Texas Instruments Incorporated, S/N: 09/447,194, filed Nov. 22, 1999, *Optimized Hardware Cleaning Function for VIVT Data Cache*.
Texas Instruments Incorporated, S/N: 09/591,656, filed Jun. 9, 2000, *Cache With Multiple Fill Modes*.

* cited by examiner

*Primary Examiner*—Kevin Verbrugge
(74) *Attorney, Agent, or Firm*—Robert D. Marshall, Jr.; W. James Brady, III; Frederick J. Telecky, Jr.

(57) ABSTRACT

A digital system is provided with a several processors, a private level one (L1) cache associated with each processor, a shared level two (L2) cache having several segments per entry, and a level three (L3) physical memory. The shared L2 cache architecture is embodied with 4-way associativity, four segments per entry and four valid and dirty bits. When the L2-cache misses, the penalty to access to data within the L3 memory is high. The system supports miss under miss to let a second miss interrupt a segment prefetch being done in response to a first miss. Thus, an interruptible SDRAM to L2-cache prefetch system with miss under miss support is provided. A shared translation look-aside buffer (TLB) is provided for L2 accesses, while a private TLB is associated with each processor. A micro TLB ($\mu$TLB) is associated with each resource that can initiate a memory transfer. The L2 cache, along with all of the TLBs and $\mu$TLBs have resource ID fields and task ID fields associated with each entry to allow flushing and cleaning based on resource or task. Configuration circuitry is provided to allow the digital system to be configured on a task by task basis in order to reduce power consumption.

13 Claims, 27 Drawing Sheets

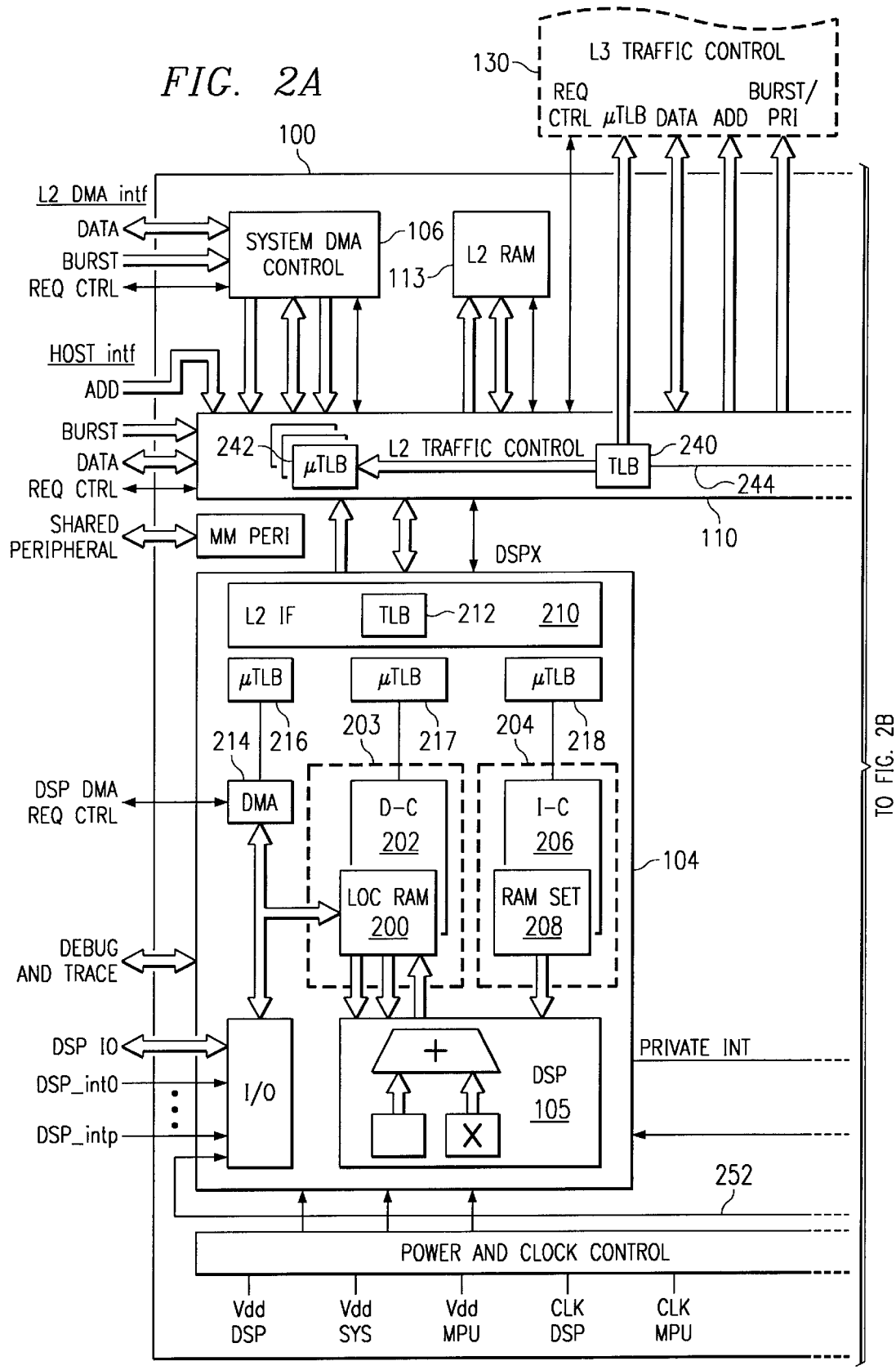

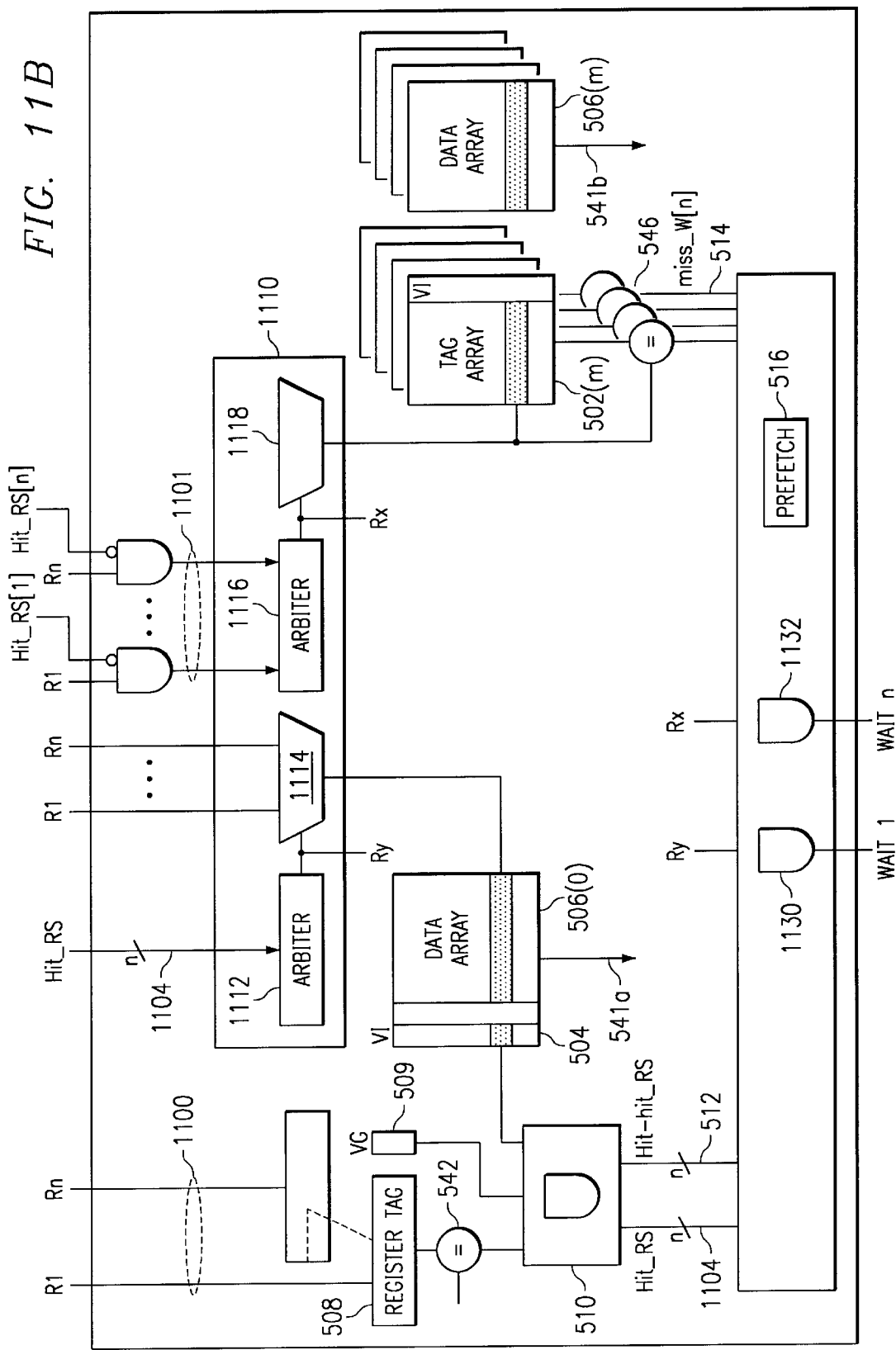

US 6,751,706 B2

MULTIPLE MICROPROCESSORS WITH A SHARED CACHE

This application claims priority to European Application Serial No. 00402331.3, filed Aug. 21, 2000.

FIELD OF THE INVENTION

This invention generally relates to microprocessors, and more specifically to improvements in cache memory and access circuits, systems, and methods of making.

BACKGROUND

Microprocessors are general-purpose processors that provide high instruction throughputs in order to execute software running thereon, and can have a wide range of processing requirements depending on the particular software applications involved. A cache architecture is often used to increase the speed of retrieving information from a main memory. A cache memory is a high speed memory that is situated between the processing core of a processing device and the main memory. The main memory is generally much larger than the cache, but also significantly slower. Each time the processing core requests information from the main memory, the cache controller checks the cache memory to determine whether the address being accessed is currently in the cache memory. If so, the information is retrieved from the faster cache memory instead of the slower main memory to service the request. If the information is not in the cache, the main memory is accessed, and the cache memory is updated with the information.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

SUMMARY OF THE INVENTION

Particular and preferred aspects of the invention are set out in the accompanying independent and dependent claims. In accordance with a first aspect of the invention, there is provided a digital system having several processors, a private level one (L1) cache associated with each processor, a shared level two (L2) cache having several segments per entry, and a level three (L3) physical memory. The shared L2 cache architecture is embodied with 4-way associativity, four segments per entry and four valid and dirty bits. When the L2-cache misses, the penalty to access to data within the L3 memory is high. The system supports miss under miss to let a second miss interrupt a segment prefetch being done in response to a first miss.

In another embodiment, a shared translation lookaside buffer (TLB) is provided for L2 accesses, while a private TLB is associated with each processor. A micro TLB ($\mu$TLB) is associated with each resource that can initiate a memory transfer. The L2 cache, along with all of the TLBs and $\mu$TLBs have resource ID fields and task ID fields associated with each entry to allow flushing and cleaning based on resource or task.

In another embodiment, configuration circuitry is provided to allow the digital system to be configured on a task by task basis in order to reduce power consumption.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which:

FIGS. 2A and 2B together is a more detailed block diagram of the megacell core of FIG. 1;

FIG. 11B is a more detailed block diagram of the L2 memory system of FIG. 5A, illustrating the request queue;

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
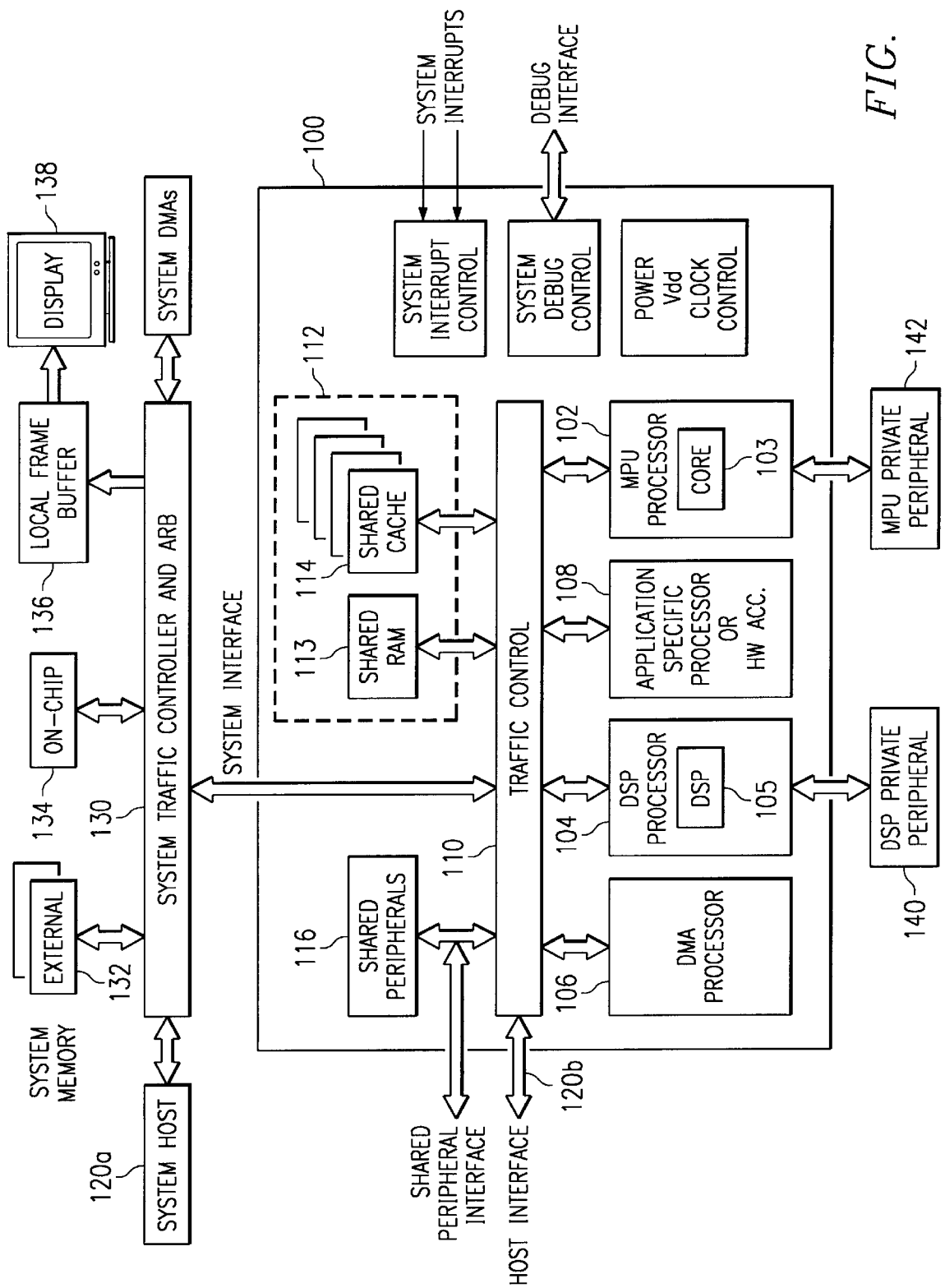
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources a system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2B:
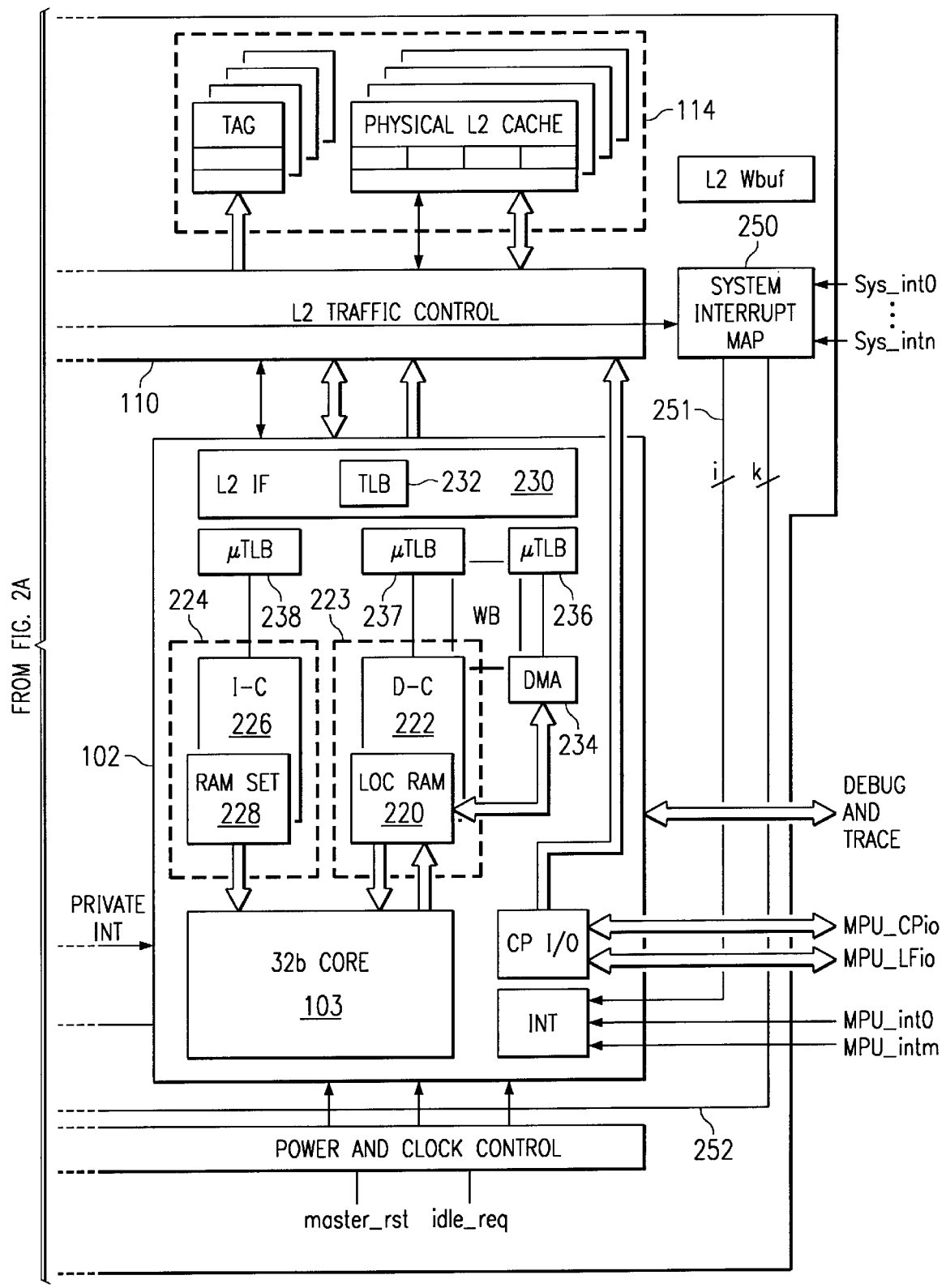

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs (μTLB) 216–218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (μTLB) 236–238 are associated with the DMA circuit, data cache and instruction cache, respectively.

L2 traffic controller 110 includes a TLB 240 and one or more micro-TLB (μTLB) 242 that is associated with system DMA block 106. Similarly, L3 traffic controller 130 includes a μTLB controllably connected to TLB 232 that is associated with system host 120. This μTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The translation look-aside buffer (TLB) caches contain entries for virtual-to-physical address translation and access permission checking. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of the R-ID field. On a slave processor such as a hardware accelerator the R-ID is equal to the R-ID of the master CPU.

Upon a TLB miss, i.e., the TLB does not contain an entry corresponding to the virtual address requested, translation table walk software retrieves the translation and access permission information from a translation table in physical memory. Once retrieved, the page or section descriptor is stored into the TLB at a selected victim location. Victim location selection is done by software or with hardware support using methods known by persons skilled in the art.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates an MMU handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

The present embodiment has a distributed operating system (OS) with several domains corresponding to each processor and therefore only a single table manager for all processors. Table update operations are limited to the corresponding R-ID for all slave processors. Access to all could be given to a super OS, such as a communication management OS. The super OS will have right to flush out entries belonging to another processor in a different OS domain. In another embodiment with several independent OSs, for example, there will independent tables. These tables can be located in a memory space only viewed by the OS that they are associated with in order to provide protection from inadvertent modification by another OS.

Translation tables and TLB cache contents must be kept consistent. A flush operation, which will be described later, is provided for this reason.

An address reference is generally located within the μTLB or main TLB of each processor sub-system; however, certain references, such as those used by system DMA 106 or host processor 120, for example, to access megacell memories can be distributed within L2 traffic controller 110 and cached into L2 system shared TLB 240. Because system performance is very sensitive to the TLB architecture and size, it is important to implement efficient TLB control commands to flush, lock or unlock an entry when a task is created or deleted without degrading the execution of other tasks. Therefore, each μTLB and L2 cache entry holds a task-ID. During execution, the current task-ID register is compared with the μTLB entry, this also provides better security, as will be described later. During MMU operation, commands are supplied to flush locked or unlocked entries of a μTLB corresponding to a selected task.

The MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks. The MMU may also provides additional information, such as memory access permission and access priority as described later.

All megacell memory accesses are protected by a TLB. As they all have different requirements in term of access frequencies and memory size, a shared TLB approach has been chosen to reduce the system cost at the megacell level. This shared TLB is programmable by each processor. The architecture provides enough flexibility to let the platform work with either an independent operating system (OS) or a distributed OS with a unified memory management, for example.

The organization of the data structures supporting the memory management descriptor is flexible since each TLB miss is resolved by a software TLB-miss handler. These data structures include the virtual-to-physical address translation and all additional descriptors to manage the memory hierarchy. The list of these descriptors and their function is described in Table 2. Table 1 includes a set of memory access permission attributes. In other embodiments, a processor may have other modes that enable access to memory without permission checks.

TABLE 1

Memory Access Permission

| Supervisor | User |
|---|---|
| No access | No access |
| Read only | No access |
| Read only | Read only |
| Read/Write | No access |
| Read/Write | Read only |
| React/Write | Read/Write |

TABLE 2

Memory Management Descriptors

| | |
|---|---|
| Execute Never | provides access permission to protect data memory area from being executed. This information can be combined with the access permission described above or kept separate. |
| Shared | indicates that this page may be shared by multiple tasks across multiple processor. |
| Cacheability | Various memory entities such as individual processor's cache and write buffer, and shared cache and write buffer are managed through the MMU descriptor. The options included in the present embodiment are as follows: Inner cacheable, Outer cacheable, Inner Write through/write back, Outer write through/write back, and Outer write allocate. The terms Inner and outer refer to levels of caches that are be built in the system. The boundary between inner |

TABLE 2-continued

Memory Management Descriptors

|  | and outer is defined in specific embodiment, but inner will always include L1 cache. In a system with 3 levels of caches, the inner correspond to L1 and L2 cache and the outer correspond to L3 due to existing processor systems. In the present embodiment, inner is L1 and outer is L2 cache. |
|---|---|
| Endianism | determines on a page basis the endianness of the transfer. |
| priority | Indicates a priority level for the associated memory address region. Memory access can be prioritized based on this priority value. |

MMU/TLB Control Operation

Figure 3:
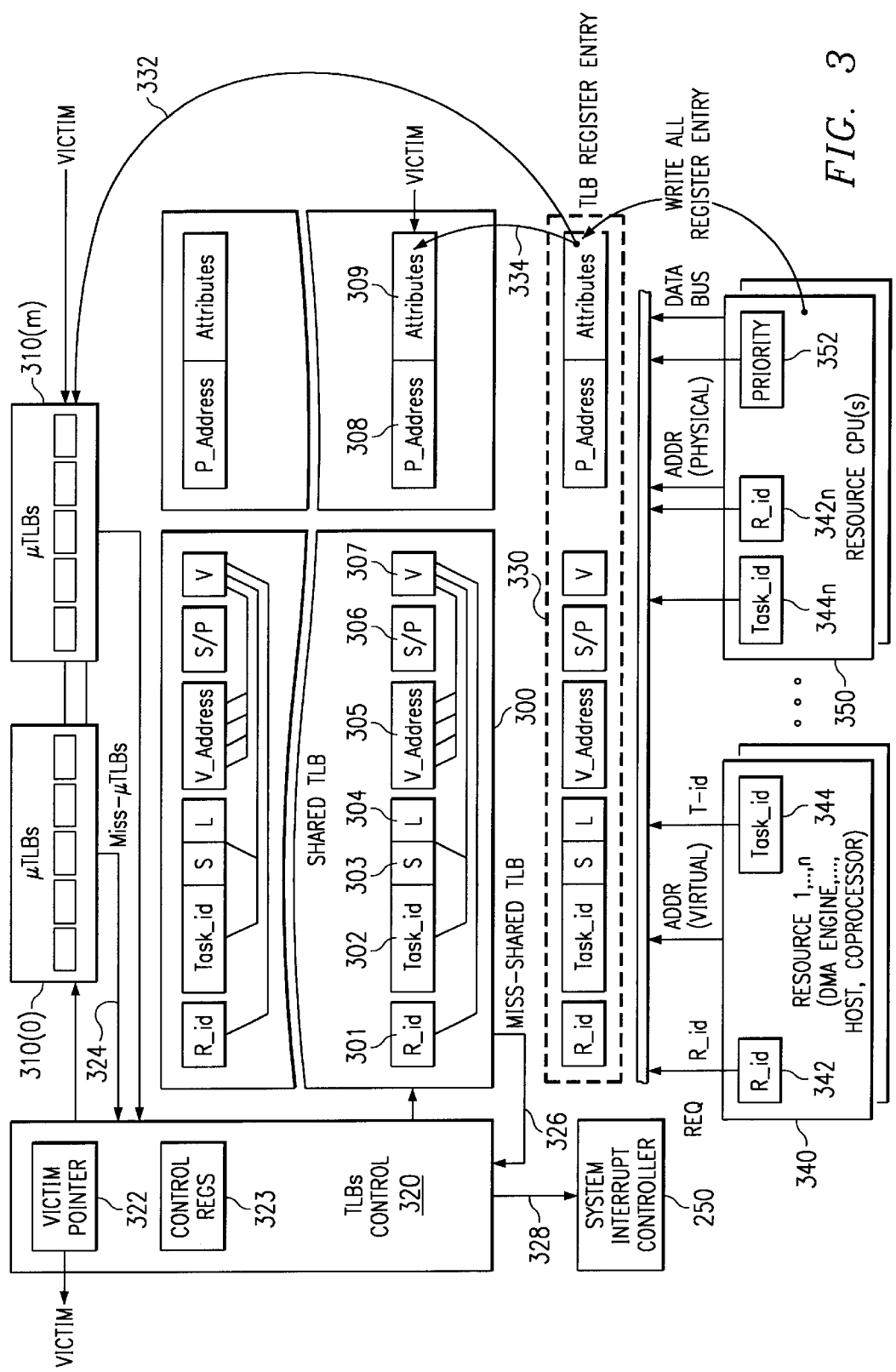
FIG. 3 is a block diagram illustrating a shared translation lookaside buffer (TLB) and several associated micro-TLBs ($\mu$TLB) included in the megacell of FIG. 2.

FIG. 3 is a block diagram illustrating a shared translation look-aside buffer (TLB) 300 and several associated micro-TLBs ($\mu$TLB) 310(0)–310(n) included in megacell 100 of FIG. 2. On a $\mu$TLB miss, the shared TLB is first searched. TLB controller 320 is alerted by asserting a $\mu$TLB miss signal 324. In case of a hit on the shared TLB, the $\mu$TLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor whose OS supervises the resource which caused the miss. A TLB entry register 330 associated with TLB controller 320 is loaded by a software TLB handler in response to the interrupt. Once loaded, the contents of TLB entry register 330 are transferred to both shared TLB 300 and the requesting $\mu$TLB at a selected victim location as indicated by arcs 332 and 334.

A separate TLB entry register 330 is only one possible implementation and is not necessarily required. The separate register TLB entry register is a memory mapped register that allows buffering of a complete TLB entry (more than 32 bits). A TLB value is not written directly in the TLB cache but is written to the TLB entry register first. Because of the size of an entry, several writes are required to load the TLB entry register. Loading of a TLB cache entry is then done in a single operation "Write TLB entry". Advantageously, others uTLBs associated with other modules can continue access the shared TLB while the TLB entry register is being loaded, until a second miss occurs.

The sequence of operations to update a TLB cache entry after a miss is:

1—control circuitry checks and selects a TLB entry, referred to as a victim TLB cache entry.
2—the software TLB handler writes to the TLB entry register, and
3—the software TLB handler sends a command to write the TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control. A victim pointer register 322 is maintained for each TLB and $\mu$TLB to provide a victim separate pointer for each. A typical embodiment will use a round robin scheme Another embodiment may use a least recently used scheme or a random scheme, for example. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the Shared TLB.

In this embodiment, each shared TLB has 256 entries. Each $\mu$TLB is generally much smaller, i.e., has fewer entries, than the shared TLB. In various embodiments, each shared TLB has 64–256 or more entries while $\mu$TLBs generally have 4–16 entries. The penalty for a miss in a $\mu$TLB is small since a correct entry is generally available from the shared TLB. Therefore, the present embodiment does not provide direct control of the victim pointers of the various $\mu$TLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. A task ID is provided by a task-ID register, such as task-ID register 344 associated with processor 340. Resource IDs are provided by a resource-ID register associated with each resource; such as R-ID register 342 associated with processor 340 and R-ID register 352 associated with resource 350. With the task-ID, all entries in a TLB belonging to a specific task can be identified. They can, for instance, be invalidated altogether through a single operation without affecting the other tasks. Similarly, the resource ID is required because task-ID number on the different processors might not be related; therefore, task related operations must be, in some cases, restricted to a resource-ID. At system initialization, all R-ID and Task-ID registers distributed across the system are set to zero, meaning that the system behaves as if there were no such fields.

In another embodiment, The R-ID and Task_ID registers are not necessarily part of the resource core and can be located in the system, such as a memory mapped register for example, and associated to a resource bus. The only constraint is that a task_ID register must be under the associated OS control and updated during context switch. R-ID must be set during the system initialization.

Referring still to FIG. 3, each TLB entry includes a virtual address field 305 and a corresponding physical address field 308 and address attributes 309. Various address attributes are described in Table 1 and Table 2. Address attributes define conditions or states that apply to an entire section or page of the address space that is represented by a given TLB entry. An S/P field 306 specifies a page size. In the present embodiment, an encoding allows page sizes of 64 kb, 4 kb and 1 kb to be specified. Naturally, the page size determines how many most significant (ms) address bits are included in a check for an entry.

Each TLB entry also includes "shared" bit 303 and a lock bit 304. All entries marked as shared can be flushed in one cycle globally or within a task. A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present.

TLB control register set 330 also includes a resource ID and task ID register to check that this address is allowed for a specific resource or for all and for a specific task or for all. When an address is missing from the $\mu$TLB, it searches the shared TLB. If a miss occurs in both, an interrupt is returned to the processor in charge.

Figure 4:
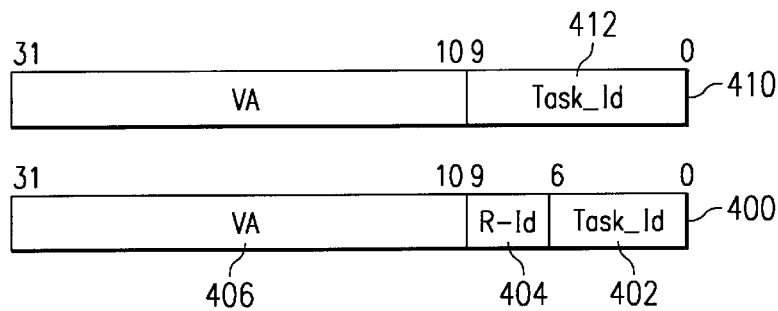
FIG. 4 illustrates a TLB control format used to operate on the TLB and $\mu$TLBs of FIG. 3.

FIG. 4 illustrates a TLB control format used to operate on the TLB and $\mu$TLBs of FIG. 3. TLB control format 400 includes a task-ID field 402, resource-ID field 404 and virtual address field 406. In some embodiments, certain of the processors might not be allowed to invalidate entries other than their own.

During execution of a program, the R-ID and Task_ID field comes from a register during each memory system access request. In a system embodiment with multi-processors with multiple independent Operating Systems (OS), the R-ID is static and indicates which of the resources is accessing a given location (address). The Task_ID indicates which of the tasks (or processes) of this resource is doing the access. The task ID is dynamic and changes one each context switch. For these systems, operations on a system TLB restricted to the associated resource are important to optimize the main system TLB management. This has the effect of having one OS domain control the TLB.

However, another system embodiment might be controlled by a middleware that supports a unified task and memory management. For those, the notion of R-ID might disappear and be treated as part of the task_ID. Restriction of TLB command based on R-ID would not be necessary in those systems and the field R-ID could be re-used to extend the task-ID field. In that case, TLB control format 410 is used in which the R_Id field is replaced by a task-ID field 412.

A processor can initiate various control operations on a TLB by writing a control word to a specific memory mapped address associated with TLB controller 320. A state machine in TLB controller 320 executes a requested control operation, as indicated by the control word. These TLB control operations are listed in Table 3. These operations are described in more detail below. For many of the operations, certain processors in an embodiment will be restricted to only affecting their own entries. This restriction is enforced by using the resource-ID provided with each write to TLB controller 320 as part of each memory access request.

TABLE 3

| TLB Control Operation |
| --- |
| Invalidate entry with VA |
| Invalidate all entries related to a Task_ID |
| Invalidate all entries related to a R_ID |
| Invalidate all shared entry |
| Invalidate All entries |
| Lock/UnLock entry |
| Lock/Unlock all entries related to a task_ID/R-ID |
| Read TLB entry |
| Write TLB entry |
| Check and select victim TLB entry |
| Set victim TLB entry |

In another embodiment, the control operations can be invoked by executing an instruction that invokes a hardware or software trap response. As part of this trap response, a sequence of instructions can be executed or a control word can be written to selected address, for example. In another embodiment, one of the processors may include instruction decoding and an internal state machine(s) to perform a TLB or Cache control operation in response to executing certain instructions which may include parameters to specify the requested operation.

For an "invalidate entry" operation, a Virtual address (VA), the associated task identifier and the resource identifier are provided using TLB control format 400. This generates an entry invalidate operation on the corresponding address, task-id and R-Id. Note that all processors of a given megacell embodiment might not be allowed to invalidate entries others than their own.

For an "invalidate all entries related to a task" operation, all entries corresponding to the provided task identifier are invalidated. This allows a master processor to free space from the shared TLB by invalidating all entries of a task belonging to another processor by using format 400. In many embodiments, certain processors are not allowed to invalidate entries belonging to another processor and therefore provide format 410. This operation invalidates all the entries corresponding to the provided task and resource identifier or to a task of the resource requesting the operation.

For an "invalidate all entry related to a Resource" operation, all entries corresponding to the provided resource identifier are invalidated. Note that all processors of a given megacell embodiment might not be allowed to invalidate entries other than their own. This provides, however, the capability to a master processor to free space from the shared TLB by invalidating all entries of another processor.

For an "invalidate all shared entries" operation, all entries in the TLB marked as shared for the requester are invalidated. The R-ID limits the effect of this operation, as discussed above.

For an "invalidate all entries" operation, all entries in the TLB matching the R-ID of the requester are invalidated. If all of the R-ID registers distributed in the system have the same value, then this operation invalidates all entries. In addition, since it may be desirable in another embodiment to have a different R-ID for a DMA engine than for CPUs, a global "enable resource-ID" bit allows the R-ID comparison to be enabled or disabled. This bit is contained in a global control register in TLB control register set 323 associated with TLB controller 320. However, a global control bit enable/disable R-ID is not required. Having all R-IDs of a multi-processor (called here resources) set to zero or to a unique value is equivalent. Choosing one of the other formats, if supported, would required a control bit set at boot time in a system configuration register that is memory mapped and under control of the master processor. This is a system control related to bus information. Others system configuration bits would be bus memory width, sync/async bus, . . . for example.

For a "lock/unlock entry" operation, a control word is written providing the VA, task-ID and R-Id which needs to be locked/unlocked. This operation sets or resets the lock field 304 in the selected entry. Restriction on R-ID applies as above.

For a "lock/unlock all entry related to a task" operation, a control word is written providing the task identifier which needs to be locked/unlocked. Restriction on R-ID applies as above.

In the case in which an independent OS is running on each processor, each OS can initiate the above operations. In that case, these operations must be restricted to entries with a resource identifier (R-Id) belonging to the requester.

In the case of a single master OS, task and memory management can be viewed as unified, removing the need for an R-Id. The R-ID can be an extension of the task-ID and as such it comes out of each core or it is hard-coded for each processor, in which case R-id comparison must configurable as enable/disable. The former provides more flexibility and removes some complexity in the TLB management: disabling the R-ID is equivalent to having a single R-ID for all the system or for part of the system.

As mentioned above, a global control bit will also determine if all the above functions must be limited to the entry corresponding to the resource ID requesting the operation.

Although it is preferable to have the same page size for memory management on all processors, it is not mandatory.

In a shared system, the TLB supports all page sizes of the system, in response to S/P field 306. Therefore, in a different embodiment, a TLB may support a different set of page sizes.

Table 3 also lists some additional operations are provided which allow a software TLB handler to access the shared system TLB: Read TLB entry, Write TLB entry, Check and select victim TLB entry, and Set victim TLB entry. These are described in more detail below.

For a "Read TLB entry" operation, an entry in the TLB pointed to by the victim pointer is transferred into TLB entry register 330. The TLB entry register can then be read and analyzed by the software TLB handler.

For a "write TLB entry" operation, the contents of the TLB entry register is transferred to a selected victim entry of the TLB. In the present embodiment, the transfer is inhibited if R_ID+Task_ID+VA match the entry pointed to by the victim pointer. That is, the contents of an entry pointed to by the victim pointer is compared to TLB entry register 330 and the TLB entry is updated with the contents of the TLB entry if the R_ID+Task_ID+VA fields do not match.

The "check and select victim TLB entry" operation has multiple functions. Its first purpose is to determine an index value for the replacement of an entry. However, it can also be used to find out if an entry in already in the TLB. The check and select operation starts from the victim pointer's current value. The R_ID+Task_ID+VA fields of a corresponding entry are checked for a match against a proffered virtual address entry. If there is no match, then the victim pointer is incremented to the next index value. In another embodiment, the victim pointer is changed using a random algorithm. During the search, if none of the entries matches, the victim pointer takes the value of the first index that follows the current index value and which is not locked. If all TLB entries are locked, a flag is raised in a status register in TLB controller 320. If a matching entry is found, the victim entry points to this matching entry, and another flag bit in the status register is set to indicate this condition. This condition is used to inhibit a transfer during a subsequent write TLB entry operation.

The "Set victim TLB entry" operation allows the software TLB handler to select a particular entry as the next victim. This is useful to support certain lock mechanisms. In the present embodiment, this operation is not necessary.

As indicated earlier, each control operation is performed by a state machine within TLB control circuitry 320 in response to writing a control word to a selected memory mapped address. For example, for the operation "Invalidate all unlocked entries related to a task id," the operation is done by a hardware loop checking each entry one by one in the TLB cache and invalidating the entry when its task-id TAG matches since the TLB is set associative. In another embodiment in which the TLB is a fully associative memory, the operation is done in one cycle. All entries with a matching task-id TAG are invalidated simultaneously.

Shared Cache and RAM

Referring again to FIG. 1, Megacell 100 includes large shared memory subsystem 112 that function as a secondary level of RAM (L2 RAM) 113 and cache (L2 Cache) 114. This level of memory is preferably called the outer level, as each processor in various embodiments may have multilevel internal memory. However, for the present embodiment, processors 102, 104 have one level of internal memory, which is referred to herein as L1 within the memory hierarchy, therefore the outer level memory subsystem will be referred to as level two (L2). The megacell outer memory 112 is organized as what's called a SmartCache, which is a configurable cache and which allows concurrent accesses on cache and RAM-set. RAM-set is a block of RAM that has aspects of cache behavior and cache control operations as well as DMA capability. The SmartCache architecture provides predictable behavior and enhanced real-time performance while keeping high flexibility and ease of use. A detailed description of a SmartCache is provided in U.S. patent application Ser. No. 09/591,537, (TI-29884) entitled Smart Cache and is incorporated herein by reference. Advantageously, RAM-set configured as a RAM offers fast memory scratchpad feature.

Megacell "outer" memory 112 can be shared between megacell internal processors and external Host processors or peripherals. RAM usage can also be restricted to the usage of a single processor thanks to the MMU mechanism, described earlier. However, in another embodiment a need might arise in the megacell to add additional physical protection per processor on some part of megacell memory to overwrite the MMU intrinsic protection.

A unified shared cache architecture of this embodiment is a four way set associative cache with segmented lines to reduce system latency. All outer memories are treated as unified instruction/data memory to avoid compiler restrictions such as data in program space or vice-versa. Size of this cache or the degree of associativity is a design choice and may vary in other embodiments of the present invention. General construction of set-associative caches are known and need not be described in detail herein. Typically, L1 caches are 16 kbytes or 32 kbytes, and the L2 cache is 128 kbytes, 256 kbytes or larger, for example. Likewise, the number of associated RAM-sets may vary in other embodiments.

RAM-set control registers, such as control register 531 in cache control circuitry 530 (FIG. 5A), are memory mapped and therefore also benefit from the protection provided by the MMU. However, this would force operations on cache or any specific RAM-set to be on separate pages for protection reasons. Therefore, a control register is provided in TLB control register set 323 (FIG. 3) to configure how and by which CPU the various parts of megacell memory are controlled. All CPUs can execute operations such as cache flushing or cache cleaning as these operations will be restricted by a resource identifier field located in the TAG area of the cache.

Figure 5B:
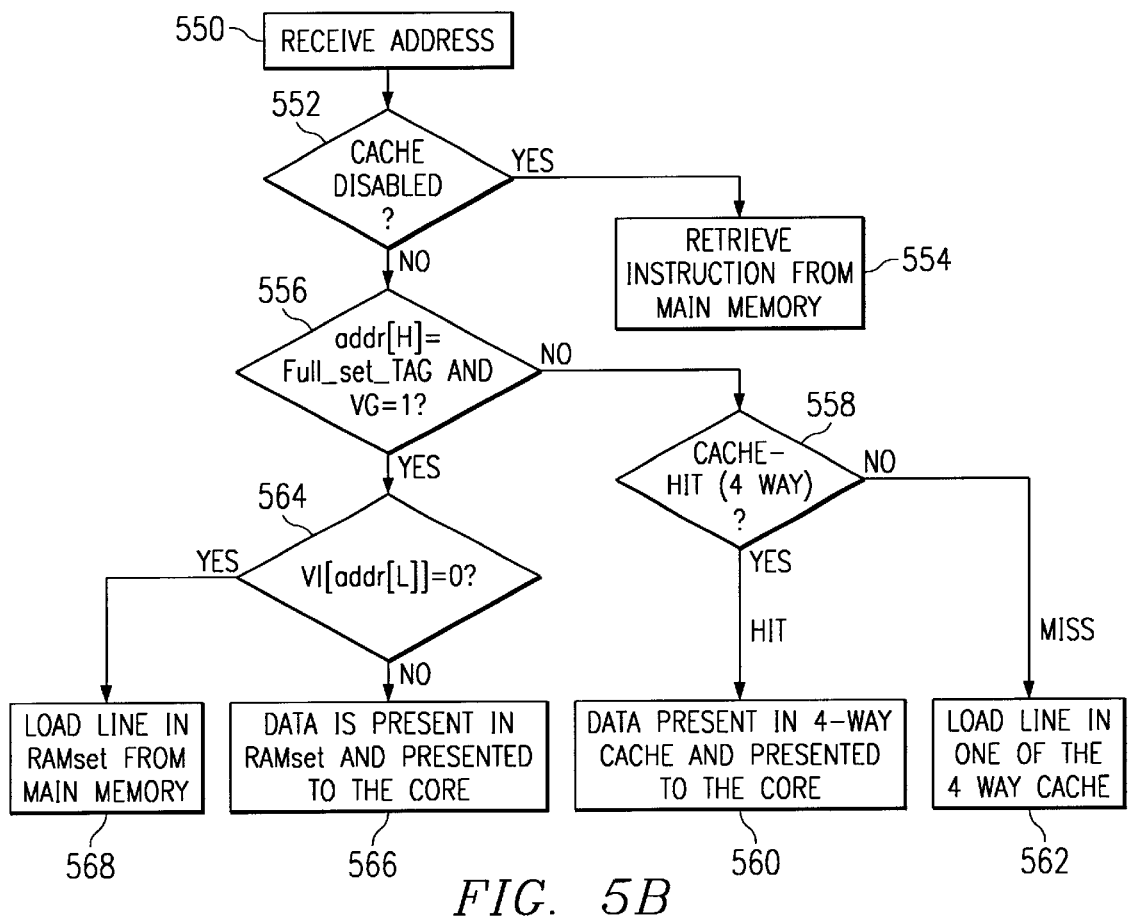
FIG. 5B is a flow chart illustrating operation of the hit/miss logic of the configurable cache of FIG. 5A.
Figure 5A:
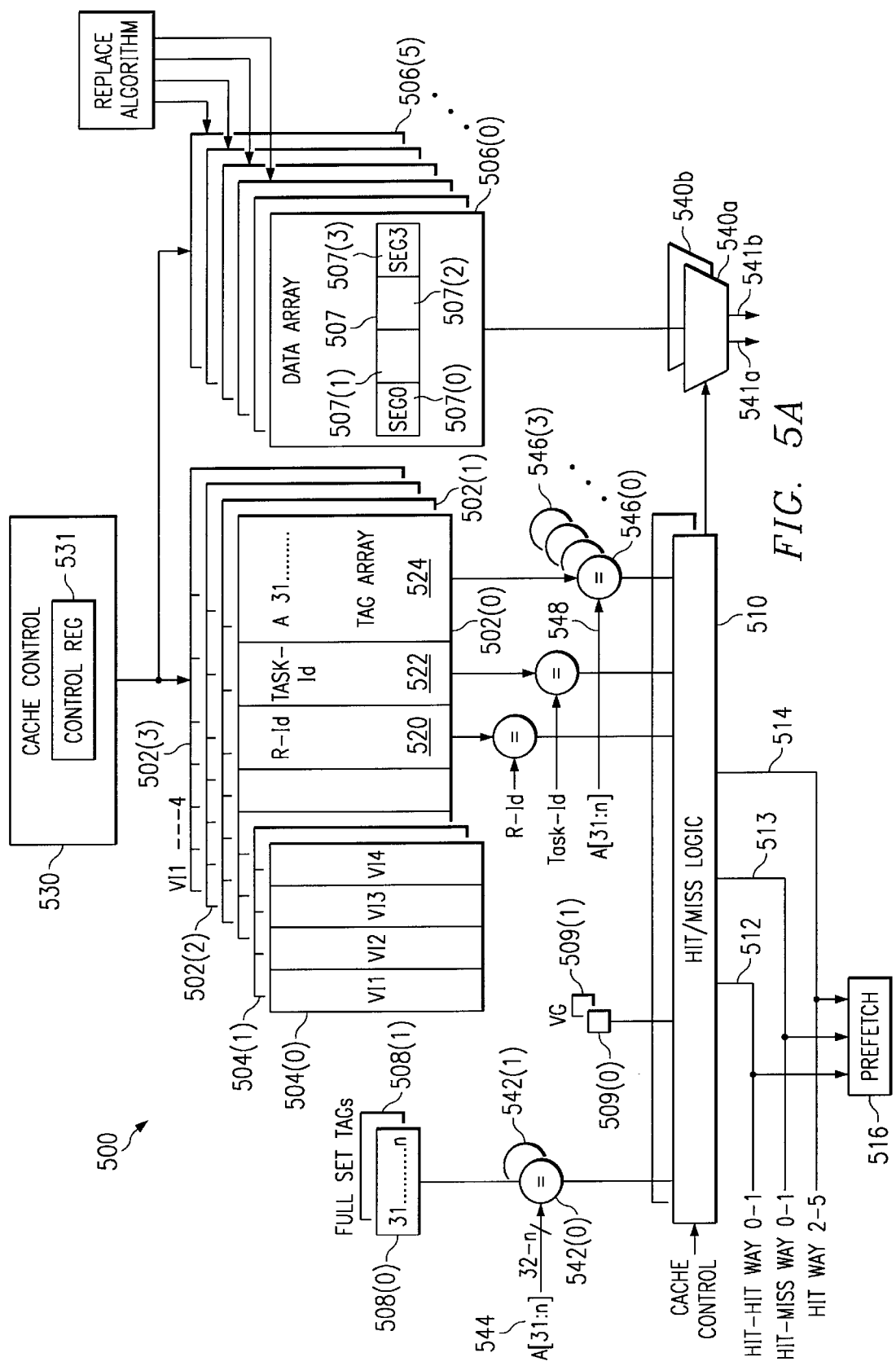
FIG. 5A is a block diagram illustrating a configurable cache that is included in the megacell of FIG. 1 that has a cache and a RAM-set.

FIG. 5A is a block diagram illustrating a representative configurable cache 500 that has a cache representative of L2 cache 114 and a RAM-set representative of shared RAM 113. Configurable cache 500 is also representative of L1 cache 203, 204, 223, and 224 that are included respectively in each of the processor modules 102, 104 of FIG. 2; however, in the present embodiment, each L1 cache has only a single segment per line. As discussed above, the configurable cache is composed of a 4-way set-associative cache that includes a TAG Array 502(0–3) and Data array 506 (2–5) and one or more additional RAM-sets, in this case data arrays 506(0–1). In the present embodiment, data array 506(1–5) are each 32 kbytes, while data array 506(0) is 64 kbytes.

During an access request, each TAG array 502(0–3) provides a tag value to a respective comparator 546(0–3) and is compared against a most significant portion of a proffered address 548. A tag value is stored in tag array 502(0–3) according to an index value that corresponds to a least significant address of a proffered address. Thus, for any proffered address, an associated tag may be found on anyone of the four tag arrays. If a tag matches a proffered address, then hit/miss logic 510 asserts a respective hit signal hitway(2–5) 514. In this embodiment, a resource ID (R-ID) field 520 and a task ID (task-ID) field 522 is also included with each entry in the tag array, along with a set of valid bits VI(1–4). Usage of these fields will be described in more detail later. Prefetch circuitry 516 receives signals 512–514 and forms a request to L3 memory when a miss occurs. For each hit, the requested date is provided via bus 541b to an output port of the cache via cache output buffer 540b. In certain embodiments, an L1 cache may have task_ID and R-ID fields, while in other L1 cache embodiments these fields may be omitted.

The RAM-set also includes valid bit arrays 504(0–1) The RAM-set can be configured as a cache extension or as a block of RAM. When configured as RAM, a loading mechanism is provided by a separate DMA engine to optimize data transfer required by multimedia applications. For each hit in the RAM-set portion of the cache, requested data is provided via bus 541a a second output port of the cache via cache output buffer 540a.

Cache control circuitry 530 includes control registers 531 which are used to configure the configurable cache. Fields in the control register include: RAM_fill_mode, Cache_enable, organization, and Full_RAM_base. The control circuitry is coupled to all of the operational blocks of the configurable cache and allows for dynamic reconfiguration of the configurable cache under control of software.

In the embodiment of FIG. 5A, the RAM-set has two different sized data arrays, Data array 506(0) is 64 kbytes and Data array 506(1) is 32 kbytes; however, other embodiments may specify all RAM-sets with the same size to simplify the hardware logic and the software model.

Each RAM-set has an associated TAG register, referred to as Full Set Tag 508(0–1) containing the base address of the RAM-set and a global valid bit (VG) 509(0–1) in addition to an individual valid bit contained in valid bit arrays 504(0–1), referred to as VI, for each segment of each segmented line in the associated data array. Each segment has also a dirty bit referred to as DI, not shown on this figure but on a later one. In the present embodiment, RAM-set lines have the same size as the cache lines; however, in other embodiments a longer line size can also be used to reduce the number of VI bits. RAM-set base registers are coupled with a logical comparison 542(0–1) on a most significant address portion 544 for each access request.

An organization field in cache control register (RAMset-ctrl[n]) 531 for each RAM-set provides the capability to configure it as a cache extension (RAM-set) or as a plain RAM. When configured as a plain RAM, the valid bits are ignored. Table 4 explains other fields in this register.

TABLE 4

Cache Control Register

| Bit[0] | 0/1 RAM-set 0 operates as a cache or as a RAM |
| Bit[1] | 0/1 RAM-set 1 operates as a cache or as a RAM |
| DMA mode bit | When set, block operations operate in DMA mode |
| Fill Mode | Line by line fill, or complete block fill |

For L2 caches, there is another control word that indicates which CPU can configure the RAM-set behavior of each L2 RAM-set. This control word is memory mapped and accessible only to the MPU master. For example: Bit[0]: 0/1 CPU master/DSP master for RAM set 0.

A status register (not shown) connected to cache control circuitry 530 provides cache information, including number of RAM-sets, sizes, Cache number of way, and line size.

When configured as a RAM, base address registers 508 (0–1) are programmed such that this memory does not overlap with other memories in the system. Note, the base address register and the full set tag register are the same. This memory space is mapped as non-cacheable at the outer level. RAM control logic (address decode) generates a hit equivalent signal, which prevents the outer cache from fetching the missing data/instruction to the external memory. VG bit 509(0–1) acts as an enable/disable. It is set when the base address register is written to and cleared when the RAM is invalidated or disabled.

If the register base address of the RAM is programmed in such a way that the associated memory area overlays with the external memory, coherency is not guaranteed by hardware of this embodiment.

When configured as a cache, hit/miss control circuitry 510 generates hit/miss signals called hit-hit 512 and hit-miss 513 for each RAM-set. A hit-hit is generated when a valid entry of the RAM-set matches the address provided by the core. An entry is valid when both VG and its VI are set. A hit-miss signal is generated when the base address of the RAM is valid (VG=1) and matches the most significant portion of an address provided by a processor but the selected entry in the RAM-set has its VI equal to zero.

The hit-miss or hit-hit signal has precedence over the hit way (2–5) signals 524 of the 4-way set-associative cache. This implies that any value loaded previously in the cache that should be in the RAM-set is never selected and will eventually be removed from the cache. However, data can create coherency problem in case of modified data (copy back). Therefore, it is recommended to write back ("clean") or even flush the range of address that will correspond to the RAM-set range of addresses. Other embodiments might not have such precedence defined and instead rely on cache invalidate operations to correctly prepare an address range that will be programmed to reside in a RAM-set, for example.

FIG. 5B is a flow chart illustrating operation of the hit/miss logic of the configurable cache of FIG. 5A. In step 550, an address is received from the processor core in connection with a read operation. If the instruction/data cache is disabled, which is checked in step 552, the instruction/data is retrieved from second level memory in step 554. If the cache is enabled, then if either the high order bits of the address from the processor (ADDR[H]) do not match the high order bits of the starting address 508(n) or the global valid bit 509(n) is set to "0" (step 556), then there is a RAM-set miss. In this case, if there is a cache hit in the 4-way set associative cache in step 558, then the information is retrieved from the 4-way set associative cache is presented to the core processor via cache output buffer 540b. If there is a miss in the 4-way set associative cache, the line is loaded into the 4-way cache from second level memory.

Returning again to step 556, if both the high order bits of the address from the processor (ADDR[H]) match the high order bits of the starting address 508(n) and the global valid bit 509(n) is set to "1", then there is a RAM-set hit at the line corresponding to ADDR[L], and the valid entry bits are used to determine whether it is a hit-hit situation where the requested instruction is present in the RAM-set and can be presented to the processor, or a hit-miss situation where the requested instruction is mapped to the RAM-set, but the information needs to be loaded into the RAM-set's data array 506(n) from the second level memory. If, in step 564, the individual valid entry bit (VI) 504(n) for the line indicates that the line is valid (VI[ADDR[L]]=1), the instruction is present in the RAM-set and is presented to the processor through the RAM-set's output buffer 540a. If, on the other hand, the valid entry bit for the line indicates that the line is not valid (VI[ADDR[L]]=0), the line is loaded into the data array 506(n) of the RAM-set from main memory in step 568.

Figure 6:
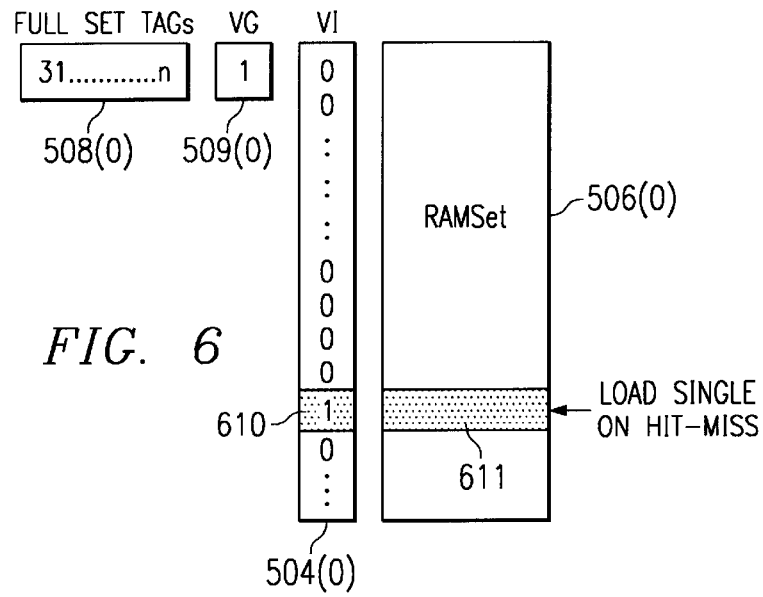
FIG. 6 is an illustration of loading a single line into the RAM-set of FIG. 5A.

FIG. 6 is an illustration of loading a single line into the RAM-set of FIG. 5A, in which only one data array 506(0) and its associated bases address register 508(0), global valid bit 509(0) and individual valid bit array 504(0) are illustrated. The RAM-set can be loaded in two ways: Line-by-line fill, and Complete fill/block fill, as indicated by the RAM_fill_mode field of control register 531.

When a new value is written into full-set TAG register (base address) 508(0), all content of the RAM-set data array associated with that TAG register is invalidated by setting individual valid bits 504(0) to logical 0; however, global valid bit 509(0) is set to logical 1. Following the programming of the base address register, the RAM-set will begin to fill itself one line at a time on every hit-miss located in the RAM-set, as discussed with reference to FIG. 5B. For example, after a miss at an address location corresponding to line 611, data is accessed from second level memory and placed in line 611, VI bit 610 is set to logical 1, and the requested data is provided to the processor.

On the other hand, if a set fill (RAM_fill_mode) is chosen, when the starting address is written to the Full_set_tag register 508(0), all or a portion of the associated data array 506(0) is filled through a block fill process. As each line is loaded from second level memory, the individual valid entry bit 504(0) corresponding to the line is set to "1".

Figure 7A:
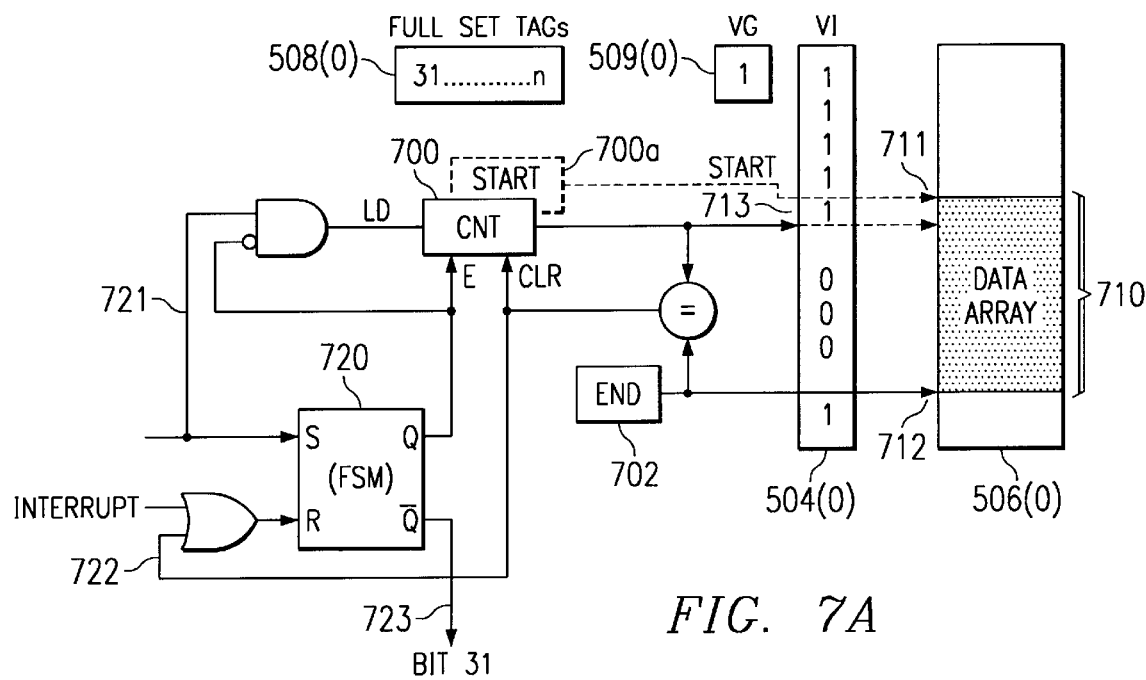
FIG. 7A is an illustration of loading a block of lines into the RAM-set of FIG. 5A.

FIG. 7A is an illustration of loading a block of lines into the RAM-set of FIG. 5A The block fill is based on two additional registers called Start (CNT) 700 and End 702. Start is a 32-n-bit counter and End is a 32-n-bit register, where $2^n$ represent the number of byte per line. An array area 710 to be filled is defined by an initial value of Start 700a, indicated at 711, and the value of End 702, indicated at 712, for example. In this embodiment, a single block operation can span one or more RAM-set, for example.

Writing a value in End register 702 sets the RAM-set control 530 in block fill mode for the block loading. Setting Start 700 after setting End 702 initiates a block transfer. At this time, all of the individual valid bits associated with array area 710 are set to logical 0. Setting Start address 700 without previously setting the end address or writing the same value in start and end simply loads the corresponding entry. A finite state machine (FSM) represented by flip-flop 720 controls the block fill. FSM 720 is part of control circuitry 530.

Asserting signal 721 causes load signal LD to be asserted to load Start register 700 and initiates the block fill. Signal LD is asserted in response to signal 721 if state machine 720 isn't already performing a block load from a prior command. Signal 721 is asserted in response to specific load operation command or a miss on load, which will be described later. As each line is loaded into array area 710, a corresponding individual valid bit is set to logical 1, such as bit 713, for example. Signal 722 is asserted when counter 700 has been incremented to equal the value in End 702. Signal 723 drives status bit 31 of a SmartCache status register to indicate when a block fill is in operation.

If state machine 720 is already performing a block load, a second one stops the current block load transfer. The system relies on the CPU to check that no active block load operation is on-going if the first prefetch must complete before another is initiated. Another embodiment could signal an error to the CPU or stall the CPU until completion of the current block load. However, the last embodiment is not suitable for real time system as the stall period becomes highly dependent on the block load size operation.

In the case of multiple RAM-sets, the start address determines in which RAM-set the block load is directed. The selection of the RAM-set is done by comparing the top part of the start address with the contents of the RAM-set base address and loading the bottom part in the counter (CNT). If the start address is not included inside any of the RAM-set, the instruction behaves like a prefetch block or respectively as a prefetch-line on the cache. Depending on the End and Start values, the block size can vary from one line to n lines.

As discussed earlier, the RAM-set of the Configurable cache can be managed in chunks of contiguous memory. Standard cache operations such as miss resulting from a CPU read access on the RAM-set prefetch I/D entry or clean entry are respectively changed into a block prefetch operation or a block cleaning operation if the end of block register 702 has been previously programmed. A block operation can also result from the programming end-of-block register 702 and start-of-block register 700. Clean operations are blocking, but interruptible on the completion of a line in order to guarantee maximum latency for real-time systems. An interrupt stops the block operation to let the CPU process the interrupt and the software then re-starts the block operation when the interrupt return occurs.

The block prefetch operation of the present embodiment re-use the existing hardware used for full cleaning of the cache; however another embodiment can have a different counter and state machine controller, for example. During the block operation the CPU can be in wait and its activity is resumed on reception of an interruption which stops the current block operation or the CPU can be concurrently running with a single cycle stall during line transfer in the write/read buffer.

Figure 7B:
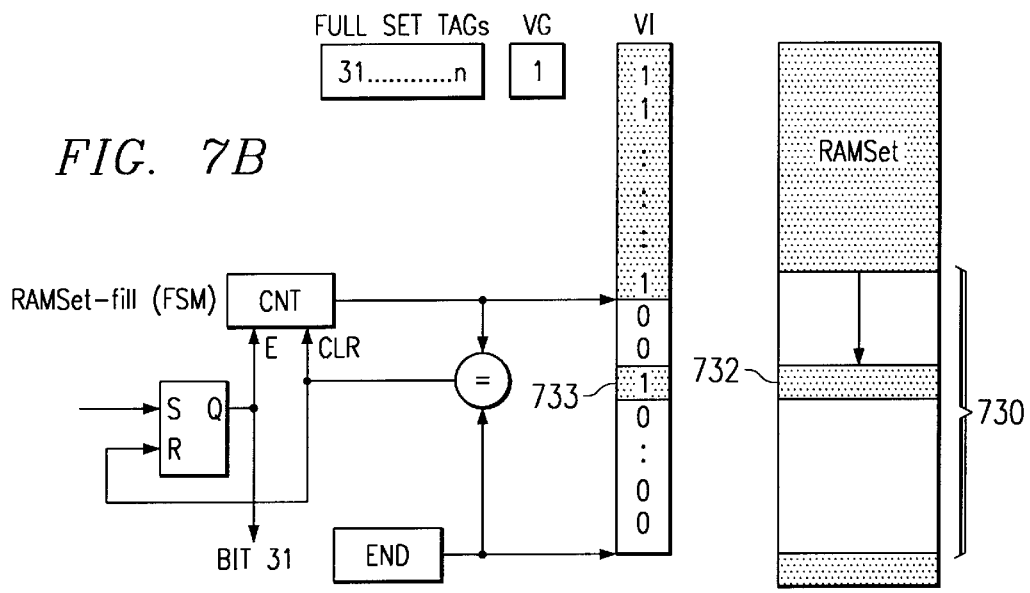
FIG. 7B is an illustration of interrupting a block load of the RAM-set according to FIG. 7A in order to load a single line within the block.

FIG. 7B is an illustration of interrupting a block load of the RAM-set according to FIG. 7A in order to load a single line within the block. To reduce system latency, a megacell processor, referred to generically as a CPU, advantageously can still access both cache and RAM-set when block loading is in progress; therefore, the following can happen:

(1) The CPU accesses a line already loaded. The CPU is served immediately or after one cycle stall if there is a conflict with a line load.

(2) The CPU accesses a line not yet loaded, referred to as hit-miss. The CPU is served after the completion of the on-going line load. For example, if an access is made to line 732 prior to being loaded by a pending block load, then VI bit 733 will be logical 0. This will cause the hit-miss signal associated with this RAM-set to be asserted. Line 732 will then be accessed and loaded into data array 730 and the CPU request is satisfied.

In order to take further advantage of the fact that a line within data array 730 has been fetched in response to a CPU access request, each line load is done in two indivisible steps. First, the entry's VI bit is checked by detection circuitry 510 in response to control circuitry 530 to determine if the entry has already been fetched. Then, only if the line is not already present in the cache or in the RAM-set, it is loaded from secondary memory.

Before initiating a block load by programming new values in End and Start, the status must be checked to see that no previous block load is on-going. In this embodiment, there is no automatic hardware CPU stall on this case and doing so would cause the on-going block load to stop. This could result in an unexpected long latency in a real-time applications for accesses into the RAM-set in which the block load was interrupted in this manner. However, in another embodiment, means are provided to allow a second prefetch block command to stop a current active one. Once the second block command is completed, the first one is resumed.

Thus, the present embodiment provides an interruptible prefetch/save block on RAM-set using current cache mechanism: miss on load and prefetch D-line/prefetch I-line respectively for data/instruction after programming the end-of-block register, the CPU being in wait during block operation. Similarly, the present embodiment provides an interruptible clean block operation on RAM set using current cache mechanism clean-entry after programming the end-of-block register, the CPU being in wait during block operation. For prefetch block, the preferred embodiment is a non blocking operation on the current embodiment.

The present embodiment provides the ability to prefetch block on RAM-set using the cache mechanism: prefetch D-line/prefetch I-line respectively for data/instruction after programming the end-of-block register with concurrent CPU cache and/or RAM-set access.

The present embodiment performs both of the above using an end-of block register and a start-of block register to initiate block operation (initial value of the block counter).

The present embodiment also extends the Interruptible Prefetch/save block scheme to the cache with no boundary limit between cache and RAM-set. This is the same as cache operation based on a range of addresses.

Cache Features

The unified cache memory of the present embodiment supports write back, and write through with/without write-allocate on a page basis. These controls are part of the MMU attributes, as described in Table 2. Hit under miss is supported to reduce conflicts between requesters and consequent latency. Concurrent accesses on RAM-sets and cache are supported.

Referring again to FIG. 5A, on a cache miss, the segment corresponding to the miss is fetched from external memory first. For this discussion, data array 506(0) will be discussed, although it is actually configured as a RAM-set instead of Cache. All of the data arrays 506(0-5) have the same organization. Each data array has a number of lines, line 507 being representative, which are segmented into four segments 507(0-3) that each hold 16 bytes data or instruction. For example, in L1 cache 224 if a miss occurs in second segment 507(1), the second segment is fetched from second level RAM 113 or cache 114 or from third level memory 132, 134 if the second level misses. Then, the third segment and finally the fourth segment are loaded into segments 507(2) and 507(3) automatically, referred to as automatic hardware prefetch. In this embodiment, first segment 507(0) is not loaded into the cache. This sequence of loads can be interrupted on a segment boundary by a miss caused by a request having higher priority. The interrupted load is not resumed, as the remaining segments will be loaded if required later in response to a new miss.

Likewise, second level cache 114 has a data array with a number of lines that are segmented into four segments that each hold 16 bytes. If second level cache 114 misses, it will be filled from third level memory 132, 134 using a multi-cycle operation in which each segment of a given line is accessed. Multi-cycle operations on second level cache 114 are non-blocking. A Multi-cycle cache operation is launched and a status bit indicates its completion. As operations can be initiated by several requesters, such as DSP 104 and MPU 102, these operations can not be blocking due to real time constraints. If one processor initiates a clean_all_task_ID or a block operation for example, other requests can interleave.

Each cache segment has a valid bit (VI) and a dirty bit (not shown) in tag array 502(0-3). Each line such as 507 also has an associated shared bit (not shown) in the tag array. On a write back when a line is replaced, only the segments with modified (dirty) data are written back. Each RAM-set segment has a valid bit (VI) in tag array 504(0-1).

In this embodiment, RAM-sets do not have Task_ID and R-ID fields and shared bit markers associated with each line. Operations on task_ID, R-ID, data marked as shared are limited to the cache. However, another embodiment may harmonize the RAM-set and cache. The hit logic of second level cache 114 only uses the address field. Task-Id and R-Id are used in task operations only.

In this embodiment, L1 caches 202, 206, 222, 226 and L2 cache 114 are organized as 4-way set associative caches. A random cache replacement strategy has been chosen for the replacement algorithm of the 4-way set associative caches. In this embodiment, the caches do not support cache entry locking except through the RAM-set.

Table 5 includes a listing of the various cache and RAM control operations that can be invoked by the processors in the megacell of the present embodiment. In this embodiment, all operations on an entry operate on segments; there are four segments per entry in the L2 cache, as discussed above. When applied to L1 caches which are segregated into a data cache and a separate instruction cache, then the flush, clean and prefetch operations are directed to the type of information contained in the targeted cache. This means that a way is provided to identify on which cache, instruction or data, a command such as flush applies.

A state machine in cache controller circuitry 530 executes a requested control operation, as indicated by a control word.

In another embodiment, the control operations can be invoked by executing an instruction that invokes a hardware or software trap response. As part of this trap response, a sequence of instructions can be executed or a control word can be written to selected address, for example. In another embodiment, one of the processors may include instruction decoding and an internal state machine(s) to perform a TLB or Cache control operation in response to executing certain instructions which may include parameters to specify the requested operation.

TABLE 5

Cache and RAM Control Operations

| Function | | Software view (memory mapped/ co-proc) |
|---|---|---|
| Flush_entry (address) | C/RS | Flush the entry[1], whose address matches the provided address or a Range of addresses, if End has been set previously. Flush-range instruction is made of two consecutive instructions Set_End_addr(address) + Flush_entry (address). |
| Flush_all_entry_of_ task_ID(task_ID) | C | Flush all entries matching to the current taskID in the cache but not in the RAM-set |
| Flush_all_entry_of_ R_ID(task_ID) | C | Flush all entries matching to the current R_ID in the cache but not in the RAM-set |
| Flush_all | C | Flush all entries in the cache but not in RAM-set |
| Flush_all_shared | C | Flush all entries marked as shared |
| Flush_all_task_ID_ shared(task_ID) | C | Flush all entries matching the current taskID and marked as shared |
| Flush_all_task_ID_ not_shared(task_ID) | C | Flush all entries matching the current taskID and marked as not shared |
| Clean_entry (address) | C/RS | Clean the entry[1], whose address matches the provided address or a Range of address if End has been set previously. Clean-range instruction is made of two consecutive instructions |

TABLE 5-continued

Cache and RAM Control Operations

| Function | Software view (memory mapped/ co-proc) | |
|---|---|---|
| | | Set_End_addr(address) + Clean_entry (address). |
| Clean_all_entry_of_ taskID(task_ID) | C | Clean all entries matching to the current taskID in the cache but not in the RAM-set |
| Clean_all_entry_ Of_R_ID(task_ID) | C | Clean all entries matching to the current R_ID in the cache but not in the RAM-set |
| Clean_all | C | Clean all entries in the cache but not in RAM-set |
| Clean_all_shared | C | Clean entries marked as shared |
| Flush_all_task_ID_ shared(task_ID) | C | Flush all entries matching the current taskID and marked as shared |
| Clean_all_taskID_ not_shared(Task_ID) | C | Clean all entries matching the current taskID and marked as not shared |
| Clean&Flush_single_ entry(address) | C/RS | Clean and flush the entry[1], whose address matches the provided address or a Range of address if End has been set previously. Clean-range instruction is made of two consecutive instructions Set_End_addr(address) + Clean_entry (address). |
| Clean&flush_all_ entry_of_taskID (Task_ID) | C | Clean and flush all entries matching to the current taskID in the cache but not in the RAM-set |
| Clean&flush_all_ entry_of_R_ID (Task_ID) | C | Clean and flush all entries matching to the current R_ID in the cache but not in the RAM-set |
| Clean&flush_all | C | Clean and flush all entries in the cache but not in RAM-set |
| Clean&flush_all_ shared | C | Clean and flush entries marked as shared |
| Clean&flush_all_ taskID_shared (task_ID) | C | Clean and flush all entries matching the current taskID and marked as shared |
| Clean&flush_all_ taskID_not_shared (task_ID) | C | Clean and flush all entries matching the current taskID and marked as not shared |
| Set_RAM_Set_ Base_addr (RAM-setID) | RS/R | Set new RAM-set base address, set VG and clear all VI and set End to last RAM-set address by default preparing the full RAM-set loading. In that case no need to write the END address before writing the start address to load the RAM-set |
| Set_End_Addr (address) | C/RS | Set end address of the next block load and set the RAM-set controller in block fill mode. |
| Set_start_addr (address) | C/RS | Set start address of a block and initiates the loading of this block |
| Prefetch-entry(address | C/RS | Prefetch-the entry, whose address matches the provided address or a Range of address if End has been set previously. Prefetch-range instruction is made of two consecutive instructions Set_End_addr(address) + Prefetch_entry (address). |
| Flush_RAM-set (RAMset_ID) | RS/R | Clear VG and all VI of the selected RAM-set |

(C: operation on the cache, RS: operation on RAM-set, R: operation on RAM)

A system with megacell 100 will sometimes be deployed in situations that involves mixed endianness. Some processors will be bi-endian with a specific endianness selected at reset or on a memory region basis. The "endianness" of a processor is a property that describes the orientation of external data when it arrives at the processor's external data bus. A processor is little (respectively, big) endian if data objects with ascending addresses will appear at more (respectively, less) significant places on the data bus.

The endianness behavior of megacell 100 is defined assuming that the addressable unit of memory is an 8-bit byte, the width when referencing a processor's external memory interface is 32 bits, and any shifting required to access objects smaller than 32 bits occurs inside the processor, i.e., no shifting is required between the external memory interface and the memory.

Figure 8:
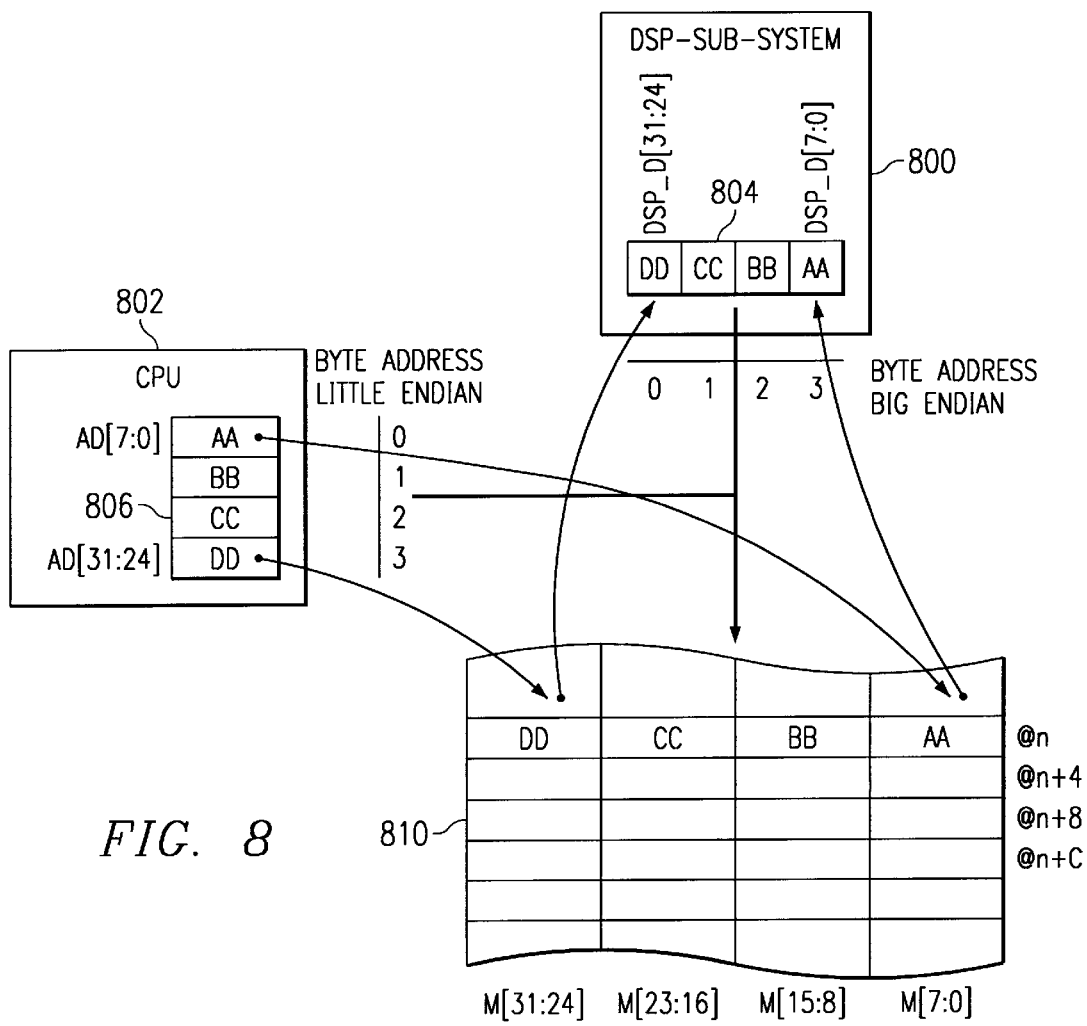
FIG. 8 is an illustration of two processors with different endianness accessing a same memory location.

FIG. 8 is an illustration of two processors with different endianness accessing a same memory location 810, in this case a DSP 800 and a CPU 802. A fundamental requirement is that external memory be connected to the processor memory interface in such a manner that accesses to 32-bit (aligned) objects yield the same results in both big and little endian modes of operation, whether within different tasks on a single processor or within different processors.

As an example, suppose that a 32-bit value 0xDDCCB-BAA is stored in the 32-bit memory word 810 at address @n. Processor 800 is big endian and CPU 802 is little endian. Endian invariance means that the data lines from the memory must be connected to a data portion of the processor's memory interface in such a manner that 0xDD is wired to the most significant byte of the data bus and 0xAA is wired to the least significant byte; this connection does not depend on the endianness of the processor. In this examples, processor 800 connects the data lines such that 0xDD appears in byte lane 0 804 according to big endianness and processor 802 connects the data lines such that 0xDD appears in byte lane 3 806, according to little endianness.

Endian invariance does not extend to objects smaller than 32 bits. If the processor writes the 8-bit value 0xEE to a location with byte address 1, then the byte overwritten in memory will be the one containing 0xBB if the processor mode is little endian and 0xCC if it is big endian. Similarly, writing the 16-bit value 0xFFEE to location 2 will overwrite 0xDDCC if the processor mode is little endian and 0xBBAA if it is big endian. In other words, data objects, smaller than the size of the data portion of the external memory interface, require positioning on the data bus that is offset from the most significant end of the bus if the mode is big endian and from the least significant end if the mode is little endian. These offsets are implemented in megacell 100 on a region basis corresponding to MMU pages by conditionally complementing byte enables based on the endianness mode included in an MMU page entry.

An access permission fault is generated when the MMU page Endianism does not fit with the corresponding device Endianism.

Detailed Aspects

Various aspects of the digital system of FIG. 1 will now be described in more detail.

Figure 9:
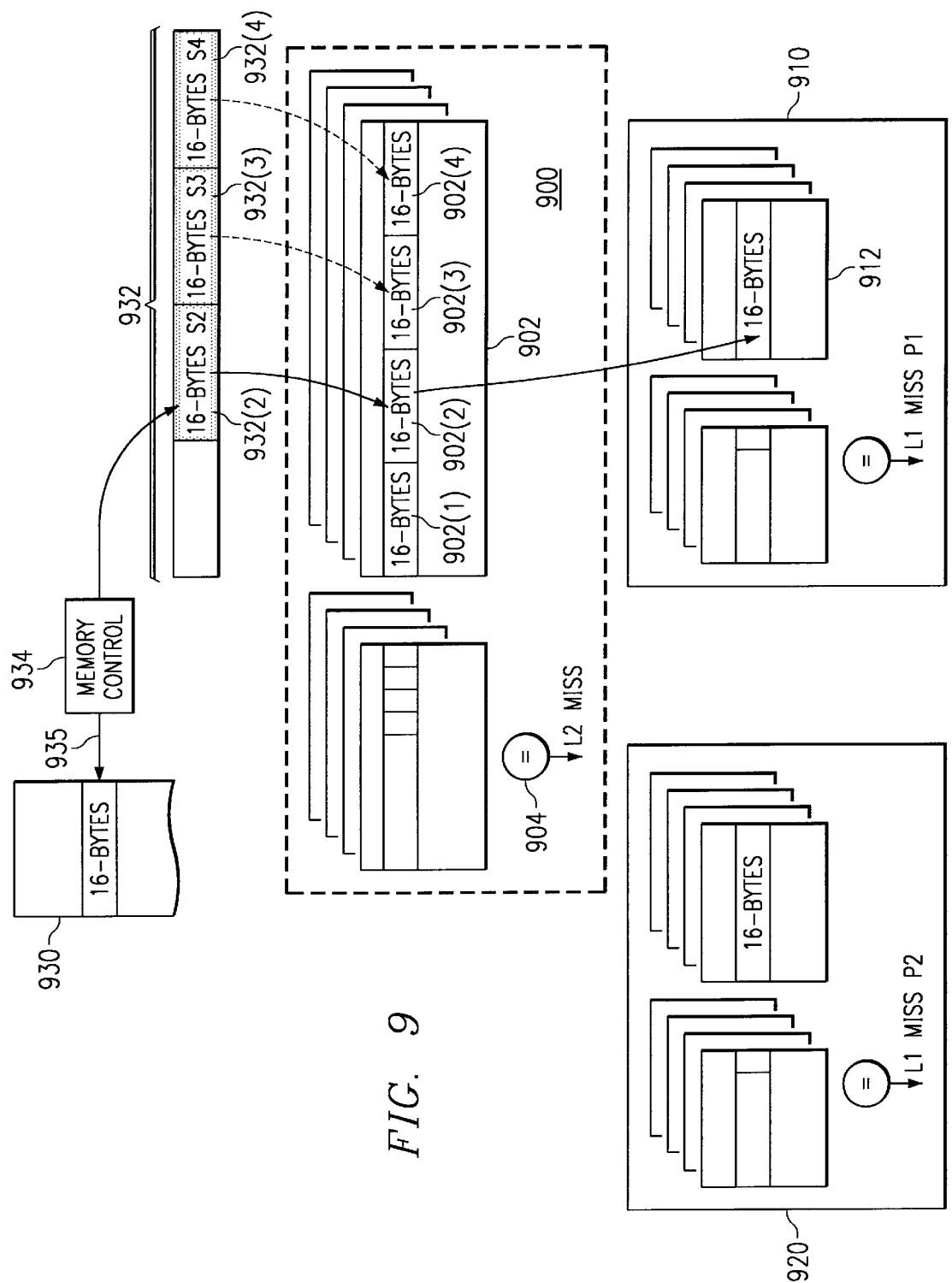
FIG. 9 is a flow diagram for the level two (L2) cache in the megacell of FIG. 1 illustrating an interruptible prefetch system that provides miss under miss support.

FIG. 9 is a flow diagram of an L2 cache 900 representative of L2 cache 114 in the megacell of FIG. 1, illustrating an interruptible prefetch system that provides miss under miss support. As described above, the L2 cache architecture of this embodiment is embodied with 4-way associatively, four segments per entry and four valid and dirty bits per entry. Backup memory 930 is representative of any L3 memory 132/134. When the L2-cache misses, the penalty to access data within L3 memory 132, 134 is high. The system supports miss under miss to let a second miss interrupt the segment prefetch for a first miss.

For example, when a processor P1 910 access to its L1 cache 912 misses and L2 cache 900 also misses, an L2-cache controller accesses backup memory 930 and transfers one or several segments 932 of 16 Bytes from memory 930 to a cache line 902, for example, in L2 cache 900. Memory controller 934 generates an address header 935 to access memory 930 in burst mode and one or several segments 932(n) of 16 Bytes can be transferred for the same request.

If, for example, an access to a segment 902(2) misses as indicated by miss circuitry 904, then the controller associated with miss circuitry 904 fetches segment 932(2) and prefetches segment 932(3) and segment 932(4). Segment 932(2) is simultaneously forwarded to processor P1 to satisfy its request. During the miss time, other request that hit the L2 cache can be served. Subsequently, if an access from a processor P2 920 misses the L2 cache, then the ongoing prefetch sequence for processor P1 is stopped and the P2 miss is served. Therefore, some of the segments in line 902 will be valid, such as 902(2–3) for example, and some of them will still be invalid, such as 902(1, 4) for example if a prefetch sequence is interrupted.

In this embodiment of the invention, a later access to line 902 will result in a miss if segment 902(1) is accessed. However, since segment 902(2–3) are valid, they will not be prefetched, only segment 902(4) will be prefetched.

Thus, an interruptible L2-cache prefetch system with miss under miss support is provided.

Figure 10:
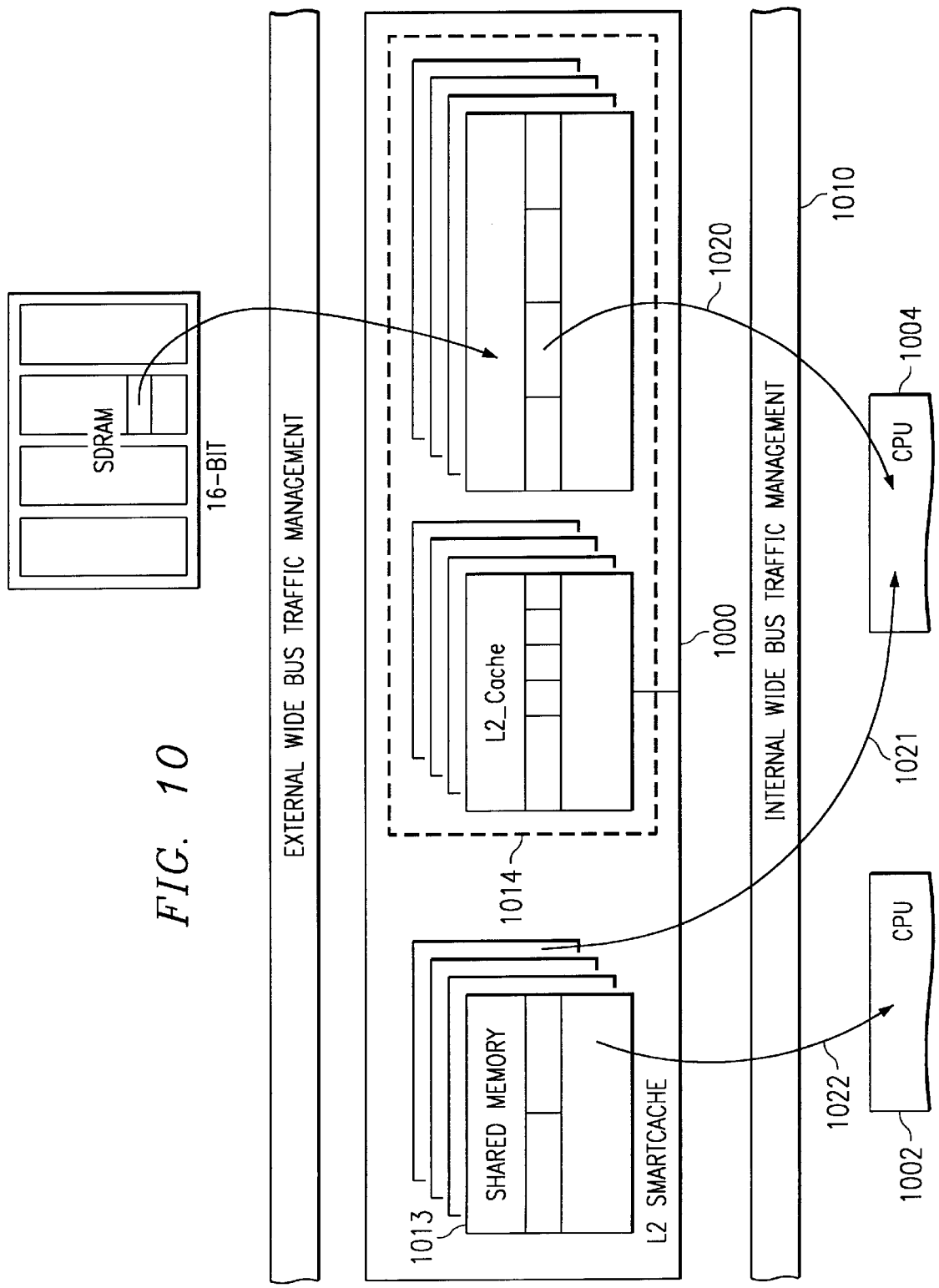
FIG. 10 is a flow diagram for the L2 configurable cache that illustrates concurrent access of the L2 cache and L2 RAM-set of the megacell of FIG. 1.

FIG. 10 is a flow diagram for an L2 configurable cache 1000 that illustrates concurrent access of L2 cache 1014 and L2 RAM-set 1013, which is representative of configurable cache 112 of megacell 100. The shared L2-Configurable cache's RAM-sets 1013 and Cache sets 1014 can be accessed concurrently. When different processors, such as processors 1002, 1004 for example, request an access to memory space stored in different memory blocks, the configurable cache 1000 services accesses in parallel.

For example, processor 1002 has request 1022 pending due to a miss in it's L1 instruction cache, processor 1004 has data request 1021 pending for a data request, and processor 1004 has request 1020 pending due to a miss in it's L1 instruction cache. Multiple buses connect processors 1002, 1004 and configurable cache 1000 and are controlled by traffic controller 1010.

Parallel decoding is done by RAM-sets 1013 to determine which pending accesses are within the address range of the RAM-set. Requests that fall within the RAM-set are excluded from cache 1014. Thus, accesses not located in RAM-sets 1013 are reordered and queued for cache 1014. RAM-set 1013 and cache 1014 then make concurrent accesses for the pending requests. If a concurrent access is not possible because the two memory spaces corresponding to the requests are in the same memory block, then the request are served sequentially.

Figure 11A:
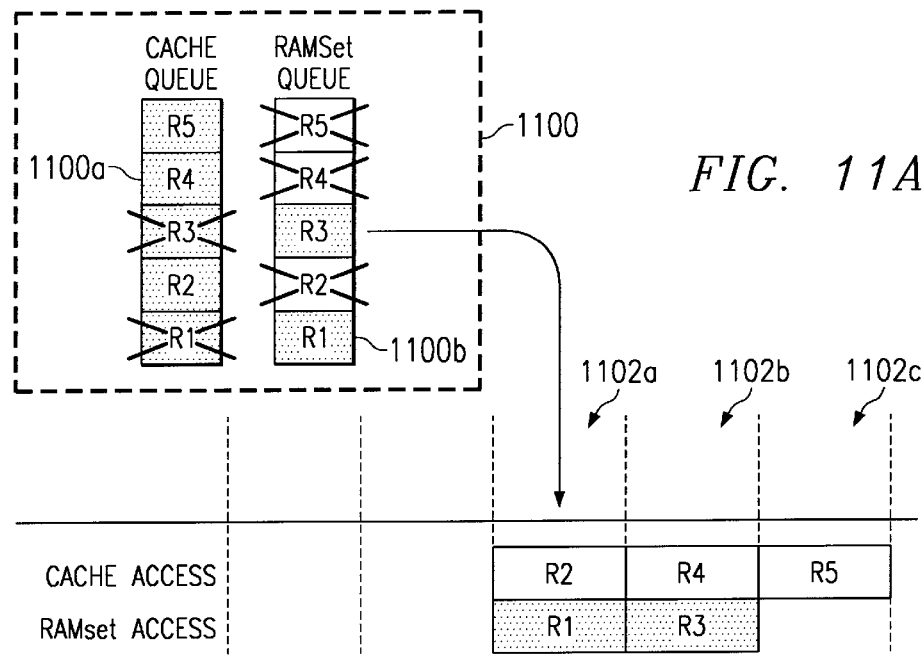
FIG. 11A illustrates a request queue for the L2 memory system of FIG. 10.

FIG. 11A illustrates a request queue for the L2 memory system of FIG. 10. The system contains a request queue 1100 that stores the waiting access request from different processors. Conceptually, two queues 1100a, 1100b are formed with a duplicate list of pending requests. Parallel decoding is then done by RAM-sets 1013 (see FIG. 10) to determine which pending accesses are within the address range of the RAM-set. Requests that fall within the RAM-set are excluded from cache 1014. In this example, requests R1 and R3 fall within the RAM-set, therefore they remain in RAM-set queue 1100b and are excluded from cache queue 1100a. Requests R2, R4, and R5 are not located in RAM-sets 1013 and are therefore are excluded from RAM-set queue 1100b. The non-excluded requests in each queue are reordered and queued for access. RAM-set 1013 and cache 1014 then make concurrent accesses for the pending requests as illustrated in time slots 1102, 1104 and 1106. If a concurrent access is not possible because the two memory spaces corresponding to the requests are in the same memory block, then the request are served sequentially.

FIG. 11B is a more detailed block diagram of the L2 memory system of FIG. 5A, illustrating the request queue circuitry. A set of pending requests R1–Rn 1100 is compared in parallel to base register 508 using a set of comparators 542. Hit circuitry 510 asserts corresponding hit_RS signals 1102 if global valid bit 509 is asserted for each pending request that matches tag register 508. Arbitration circuitry 1112 within management circuitry 1110 receives hit_RS signals 1102 and selects one Ry from among those that are asserted. Multiplexor 1114 is responsive to arbitration circuitry 1112 and selects corresponding request address Ry from pending requests R1–Rn and applies this selected request address to RAM-set data array 506. Thus, the set of asserted Hit_RS signals 1102 correspond to RAM-set queue 1100b as illustrated in FIG. 11A. If the associated individual valid bit VI 504 is set, hit-hit signal 512 is asserted and a requested data/instruction value is returned to the requester. If the associated individual valid bit is not set, then a hit-miss condition occurs, as discussed earlier, and a wait indication is asserted by wait circuitry 1130 while a RAM-set fill is performed.

Concurrently, arbitration circuitry 1116 within management circuitry 1110 receives cache request signals 1101 and selects one Rx from among those that are asserted. Multiplexor 1118 is responsive to arbitration circuitry 1116 and selects corresponding request address Rx from pending requests 1100a and applies this selected request address to cache tag array 502(n). Each cache request signal 1101 is asserted only if a request R1–Rn is asserted and a corresponding hit_RS signal 1102 is not asserted. Thus, the set of asserted cache request signals 1101 correspond to cache queue 1100a as illustrated in FIG. 11A. If one of miss-way signals 514 is not asserted, then a hit has occurred and the requested data/instruction is returned to the requester. If all four miss-way signals are asserted, then a miss condition occurs, as discussed earlier, and a wait indication is asserted by wait circuitry 1132 while a cache fill is performed under control of prefetch circuitry 516.

An aspect of the present embodiment is that during the loading of the L2 cache, which takes potentially several tens of cycles, the arbitrator 1116 may let other CPUs access the L2 cache. If they hit, they can continue without being impacted by the miss caused by a prior CPU request. If they miss but have a lower priority they wait until completion of the current transfer. If they miss and have a higher priority, they could interrupt the current transfer on a segment boundary and be served next depending on the state of the memory controller.

For example, single port dynamic access RAM (SDRAM) memory 134 has a controller that provides information such as active row, as described in U.S. Pat. No. 6,253,297, Memory Control Using Memory State Information for Reducing Access Latency. If the higher priority request is for an SDRAM active row, then it might be worth interrupting the previous burst. Otherwise, it might be preferable to complete the current transfer to avoid unnecessary pro-charge operation on the SDRAM.

Figure 12A:
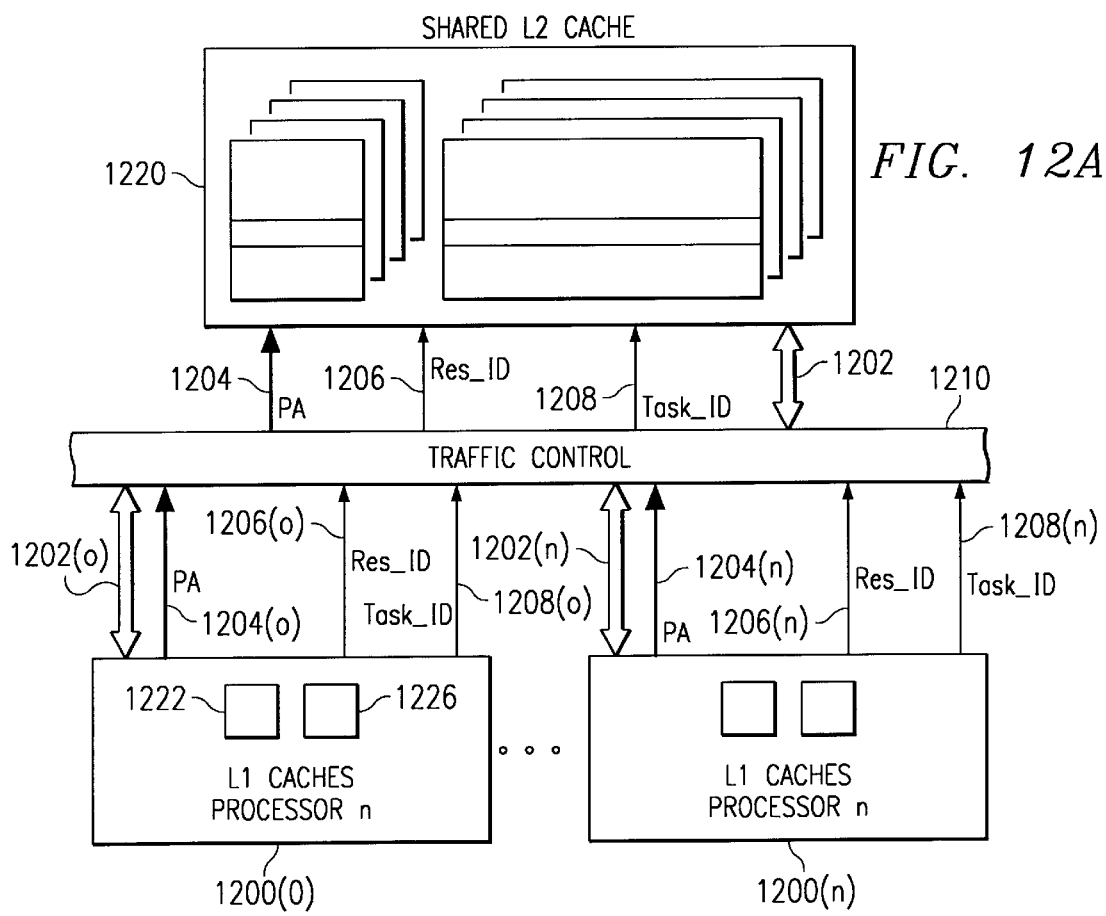
FIG. 12A is a more detailed block diagram illustrating various inter-connections between processors and the L2 cache of FIG. 1.

FIG. 12A is a more detailed block diagram illustrating various inter-connections between processors 1200(0-n) and L2 cache 1220, representative of the L2 cache of FIG. 1. A data bus 1202(n), physical address bus 1204(n), resource ID signals 1206(n), and task ID signals 1208(n) provided by each processor 1200(n) for each L2 request. Recall from earlier description that TLBs associated with each requester provides the physical address and resource/task ID signals for each request. Traffic controller 1210 provides request priority selection and sends the highest priority request to L2 cache 1220 using data bus 1202, physical address bus 1204, resource ID signals 1206, and task ID signals 1208 to completely identify each request. In the present embodiment, TLBs are used to convert virtual address to physical address and also respond to task ID and resource ID, as described with earlier.

In another embodiment, a TLB may not be needed and will therefore not provide the physical address and resource/task ID signals for each request. In that case, address signals and resource/task ID signals are provided directly from registers associated with the requesting device, for example.

Figure 12B:
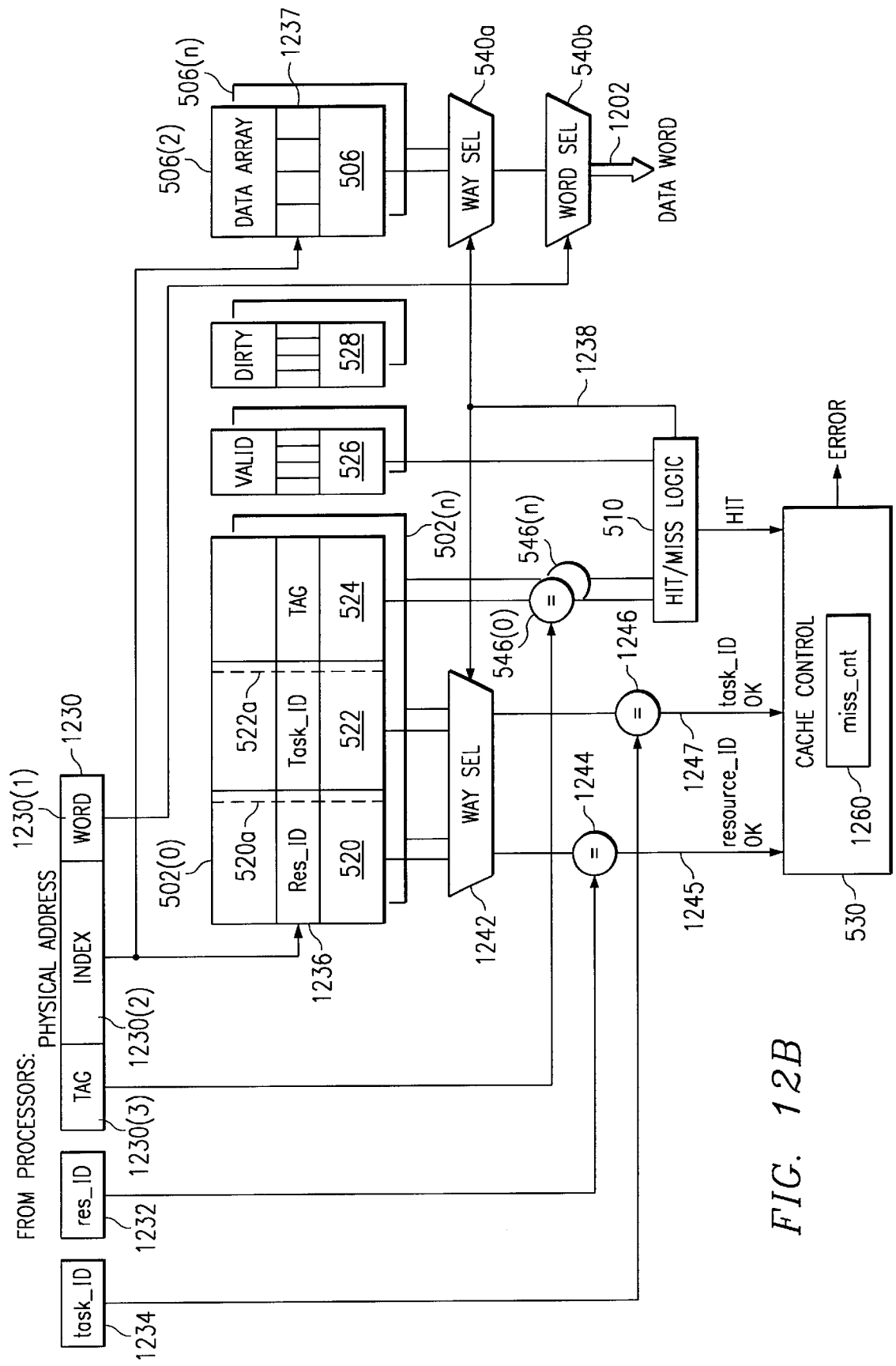
FIG. 12B is a more detailed block diagram of the L2 cache of FIG. 12A, illustrating tag circuitry with task ID and resource ID fields.

FIG. 12B is a block diagram of the L2 cache of FIG. 12A, illustrating tag circuitry with task ID and resource ID fields. As discussed earlier, the shared multiprocessor L2_cache architecture has a task_ID field 522 and Resource_ID field 520 to identify the device using the corresponding resource and task. Adding these qualifier fields to the shared level-2 cache identifies all entries belonging to a task and/or to resource. This provides improved system safety and control.

For each memory access request, a proffered physical address 1230 received on address bus 1204 is treated has having a tag portion 1230(3), an index portion 1230(2) and a word portion 1230(1), as is commonly understood for set associative caches. In addition, a resource ID field 1232 is received on bus 1206 and a task ID 1234 is received on bus 1208. Index portion 1230(2) is used to select a tag line 1236 from each tag array 502(n) and associated data line 1237 from each data array 506(n). Separate comparators 546(n) then compare tag portion 1230(3) to tag field 524 from each tag array 502(n). Note that only two arrays are shown, but for a four way set-associative cache, there are actually four arrays. Hit/miss logic 510 reports a hit if a match occurs as indicated by any of comparators 546(n) and if the entry is marked valid, as indicated by valid field 526. Select signals 1238 then are asserted to way-select circuitry 540a to select one data line 1237 according to which tag array matched the tag portion of the proffered address, and word portion 1230(1) causes word select circuitry 540b to select an appropriate word from the selected data line 1237 and provide it on data bus 1202.

Way select circuitry 1242 also responds to select signals 1238 to select one resource ID field 520 and one task ID field 522 according to which tag array matched the tag portion of the proffered address. Comparators 1244 and 1246 then compare the proffered resource ID 1232 and task ID 1234. Resource OK signal 1245 and task OK signal 1247 are both asserted if both fields match. If one or the other proffered fields 1232, 1234 do not match selected fields 520, 522, then control circuitry 530 asserts an error signal.

Thus, advantageously, system integrity is improved by assuring that each access to a shared cache is constrained by resource ID and task ID.

Each resource ID entry and task ID entry is validated before being acted upon. If either or both qualifier fields for a given entry are not valid, then it is ignored. In the present embodiment, a valid bit is included in each tag field, as indicated at 520a and 522a. Each qualifier field is initialized when a miss occurs and data is fetched from L3 memory. The valid bits associated with the proffered task ID and resource ID are provided with the cache access request by the TLB that provides the physical address. During a hit, comparators 1244 and 1246 also examine valid bits 520a, 522a associated with a selected tag entry. If task ID valid bit 522a indicates an invalid task-ID entry, then task OK signal 1247 is asserted to ignore the task field for that access. Likewise, if resource ID valid bit 520a indicates an invalid resource-ID entry, then resource OK signal 1245 is asserted to ignore the resource field for that access.

In another embodiment, instead of providing task ID valid bit 522a and resource ID valid bit 520a, the contents of a field entry is set to a select value, such as all ones, to indicate an invalid entry. In another embodiment, qualifier fields in the tag array do not have an associated validation feature; instead, the validation bits provided by the TLB with the cache request are used directly to validate a qualifier field comparison.

Referring again to FIG. 12B, in a dynamic system environment and at fortiori in a multi-processor system with shared memory cache, it becomes advantageous due to the cache size to have selective control over the cache to improve performance and reduce power consumption. Task-ID 522 and resource-ID 520 have been added to the TAG array as a qualifier field for cache operations of Table 5, such as flush (invalidate), clean or even lock/unlock. All entries of the shared system cache belonging to a task or respectively to one of the system resource (CPU, coprocessors, etc.) can be identified within a single cache command, as illustrated in Table 2. Advantageously, a task which ends or is terminated can be removed and thereby create free spaces in the cache. This minimizes eviction of useful entries of active tasks and thereby reduces power consumption.

Control circuitry 1250 receives an operation command on control port 1251 from one of the processors in the megacell. The command specifies a particular qualifier value that is to be used for the operation and this is stored in storage circuitry 1252. The control circuitry has outputs 1254a, b connected to the tag array to select a tag entry. Operation command finite state machine (FSM) 1253a and index counter 1253b operate together to sequentially select each and every tag entry in tag array 502(0-n) by using most significant bits 1254a as an index value into the tag array. The least significant bits 1254b of counter 1253b are connected to way-select mux 1242 to sequentially select each tag array of a multiple set array. Comparators 1256a, b are connected to receive the qualifier fields of the selected tag entry and compare them to the specified qualifier value(s) in latch 1252. If there is a match, then appropriate modification signals 1258 are asserted to modify the selected tag entry according to the operation command.

For example, on detection of the command "flush_all_entry_related_to_task_ID" issued by the MPU, a hardware counter 1253b is incremented to search all the L2_cache and the command flushes all entries belonging to the given task identifier (task-ID) or/and to the given resource identifier (R-ID) by turning off an associated valid bit 526. At each iteration of the hardware loop, the task-ID, or/and respectively the R-ID, field is compared with the task-ID, or/and respectively the R-ID, provided through the command. In case of match, the entry is flushed out. Similarly, the system supports clean and clean&flush operations based on task-ID field and R-ID field. A "clean" operation writes an entry out to backup memory if the associated dirty bit 528 is set.

In another embodiment, this fast hardware looping mechanism is also applied to a one-bit field called "shared". Similarly, all entries marked as "shared" can be cleaned or flushed out through a single command. A shared bit is included with each tag entry in the tag array. Each proffered request includes a shared value that is provided by a TLB that translates the address for each request.

In another embodiment, other types of qualifier fields may be included within the tag entry.

In an embodiment that has qualifier field validation, such as a valid bit or invalid value, for example, an invalid qualifier field is ignored. Therefore, tag entries with invalid entries will be ignored. However, in this case, a command to modify tag entries with invalid qualifiers may be provided.

In another embodiment, a task ID could also be applied to an L1 cache to allow cleaning and flushing of an L1 cache based on task ID; however, for a small cache size there may not be sufficient benefit.

The master CPU, or any CPUs in the system within their R-ID limits, can initiate these commands. Ordinary accesses, resulting from an L1-miss, will stall these commands. After an L1 miss is satisfied, the stalled command is then automatically resumed.

In another embodiment, a task ID could also be applied to an L1 cache to allow cleaning and flushing of an L1 cache based on task ID; however, for a small cache size there may not be sufficient benefit.

In this embodiment, a hardware loop controlled by a single command is provided by state machine 1253*a* under control of the MPU to clean or flush all entries of a given task. In another embodiment, a similar state machine can be under control of the DSP or an external host processor. Alternatively, control circuitry can be provided to perform a flush operation in a simultaneous manner for all entries, rather than operating in a looping manner, using a content addressable memory circuit, for example. Likewise, multiple entries could be cleaned in parallel by providing sufficient write buffer space.

Figure 13:
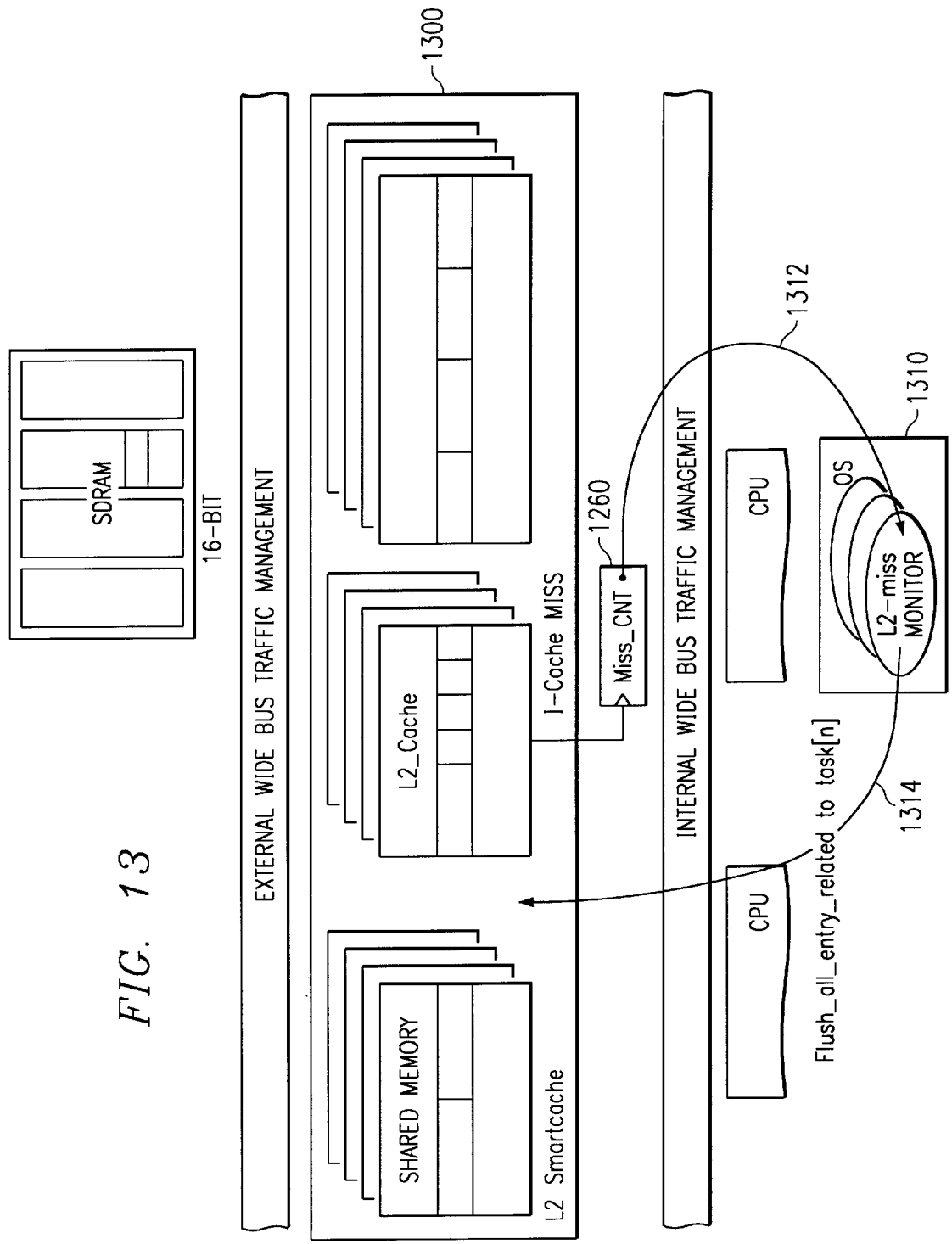
FIG. 13 is a block diagram illustrating monitoring circuitry within the megacell of FIG. 2 to manage cleaning and flushing based on average miss rate measure.

FIG. 13 is a block diagram illustrating monitoring circuitry within the megacell of FIG. 2 to manage cleaning and flushing based on an average miss rate measure. For large caches the penalty to clean or flush is high even if only the entries corresponding to a task or resource are considered; therefore, flushing may be deferred for a period of time. If the cache is not flushed at some point of time, the miss rate may increase. Therefore, in the current embodiment, the OS periodically monitors a miss rate counter (Miss_CNT) 1260 located in cache control circuitry 530 (see FIG. 12B). A background task 1310 that is executed on one or more of the processors that access shared cache 1300 uses the miss rate to decide when to flush the entries corresponding to a task or resource recently deleted.

In an alternative embodiment, various aspects of the system may be reconfigured in response to exceeding a miss rate threshold.

Figure 14:
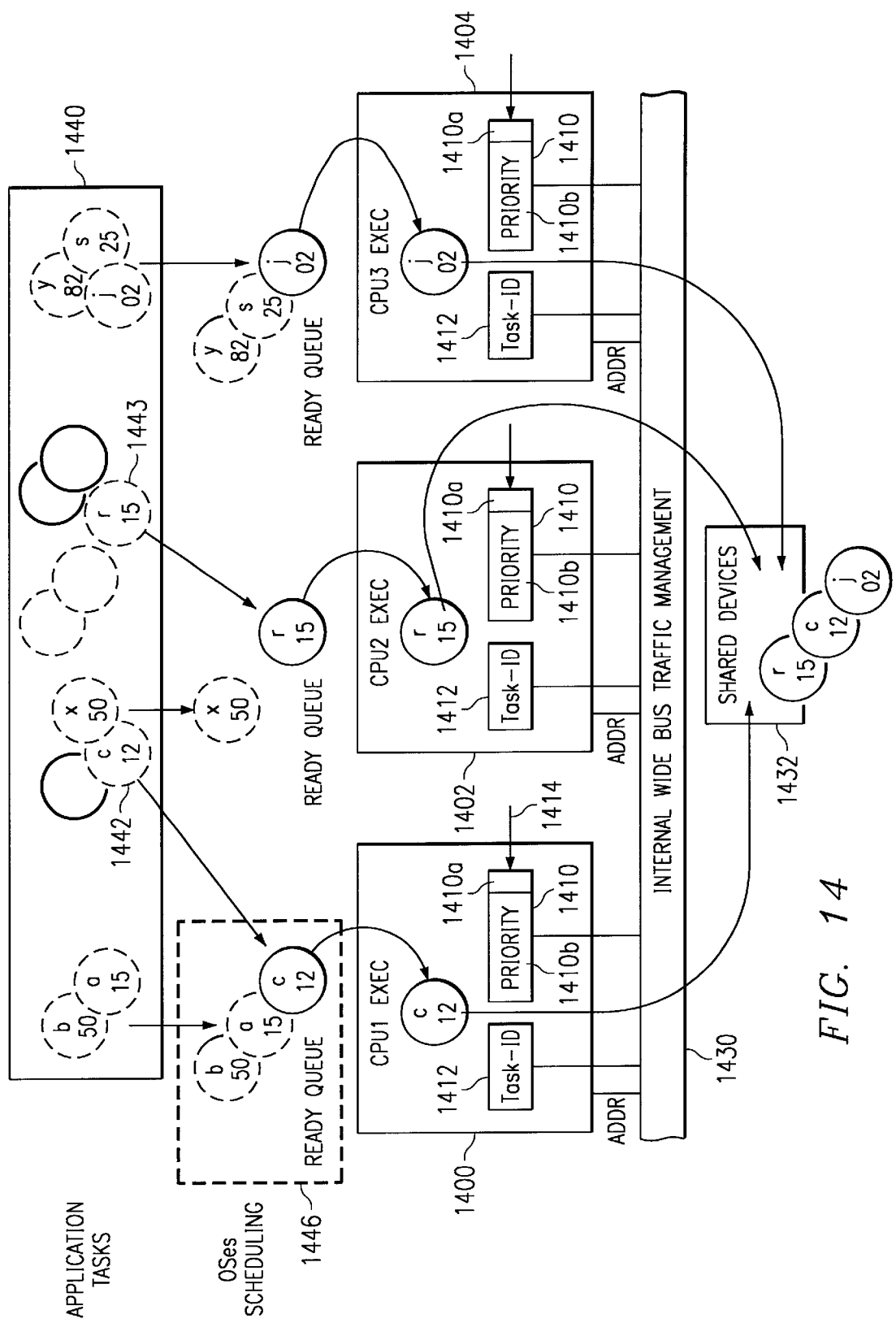
FIG. 14 is a block diagram illustrating a priority register in each processor of a megacell similar to that of FIG. 1 for task based priority arbitration.

FIG. 14 is a block diagram illustrating a priority register in each processor of a megacell similar to that of FIG. 1 for task based priority arbitration. Typically, each software task includes a task priority value that is commonly used by an operating system to schedule an order of execution for a set of pending tasks 1440. In this illustration, a circle such as 1442 represents a task, with a task name "c" and a task priority of 12, for example. Likewise, task 1443 has a task name "r" and a priority of 15, where a lower number indicates a higher priority. If the set of tasks 1440 are assigned to three processors, then an operating system on each processor forms a ready to execute queue, such as ready queue 1446 in which task "c" is scheduled for first execution, then task "a" and finally task "b" according to priority values of 12, 15, and 50 respectively. In a prior system, access to shared resources 1432 would be based on an access priority associated with the processor on which a task is executed. Unfortunately, this scheme may result in slow execution of a high priority task on a low priority processor.

Three processors 1400, 1402, 1404 are illustrated; however, the concept is applicable to only two processors or to four our more. A priority register 1410 is associated with a task_ID register 1412 in processor 1400. Each of the other processors is similarly equipped. A priority field value from priority register 1410 is exported to traffic control logic 1430 that prioritizes access to shared resources 1432, that can be L2 cache, for example, or other memory or interface devices, for example.

One bit 1410*a* of register 1410 is responsive to interrupt signal 1414 such that whenever 1400 performs a context switch in response to an interrupt, bit 1410*a* is set to a value to indicate an interrupt service routine (ISR) is being executed.

In a first embodiment with a simple solution, portion 1410*b* of register 1410 is only one bit, such that register 1410 is a 1+1 bit register (2-bits). As discussed above, bit 1410*a* is set by the hardware when an interrupt (or an exception) occurs. An application program being executed by processor 1400 can configure portion 1410*b* and will provide one value to the bit if the application must execute with a defined maximum real time, referred to as "hard real time" (HRT). On the other hand, an application that does not have a hard time limit will provide another value to the bit to indicate "soft real time" (SRT). An operating system on processor 1400 can control both bits. Thus, 2-bit priority code is formed as described in Table 6. In the case of an interrupt, the contents of priority register 1410 are saved prior to taking an ISR context switch.

TABLE 6

| 1 + 1 Bit Priority | | | |
|---|---|---|---|
| Type of task | priority | Set by | code |
| Interrupt service routine | highest | Interrupt hardware | 00 |
| Kernal OS task | | Kernal software | 01 |
| Hard real time task | | Application software | 10 |
| Soft real time task | lowest | default | 11 |

In an alternative embodiment, priority register portion 1410*b* is n bits, where n is generally 8-bits. One bit 1410*a* of register 1410 is responsive to interrupt signal 1414 such that whenever 1400 performs a context switch in response to an interrupt, bit 1410*a* is set to a value to indicate an interrupt service routine (ISR) is being executed. Bit 1410*a* is treated as a most significant bit of priority register 1410, thus 1+n bits are provided for the OS priority field by priority register 1410. In this embodiment, a task priority associated with each task is loaded in priority register portion 1410*b* as each task begins execution.

In either embodiment, the 2 bits or n+1 bits are used to control the priority of accesses to shared resources 1432. In addition, each resource is also assigned a priority. If two resource make a requests with identical task priority to a shared resource, then access to the shared resource is provided in a round robin manner so that the higher priority resource doesn't starve the lower priority resource.

In an alternative embodiment, two fields are used to determine the access priority to the shared resources. One field comes from the processor and carries the priority associated with the current task and the second field comes from an MMU TLB that contains the priority of a given MMU page. The highest value is used for priority arbitration.

Figure 15:
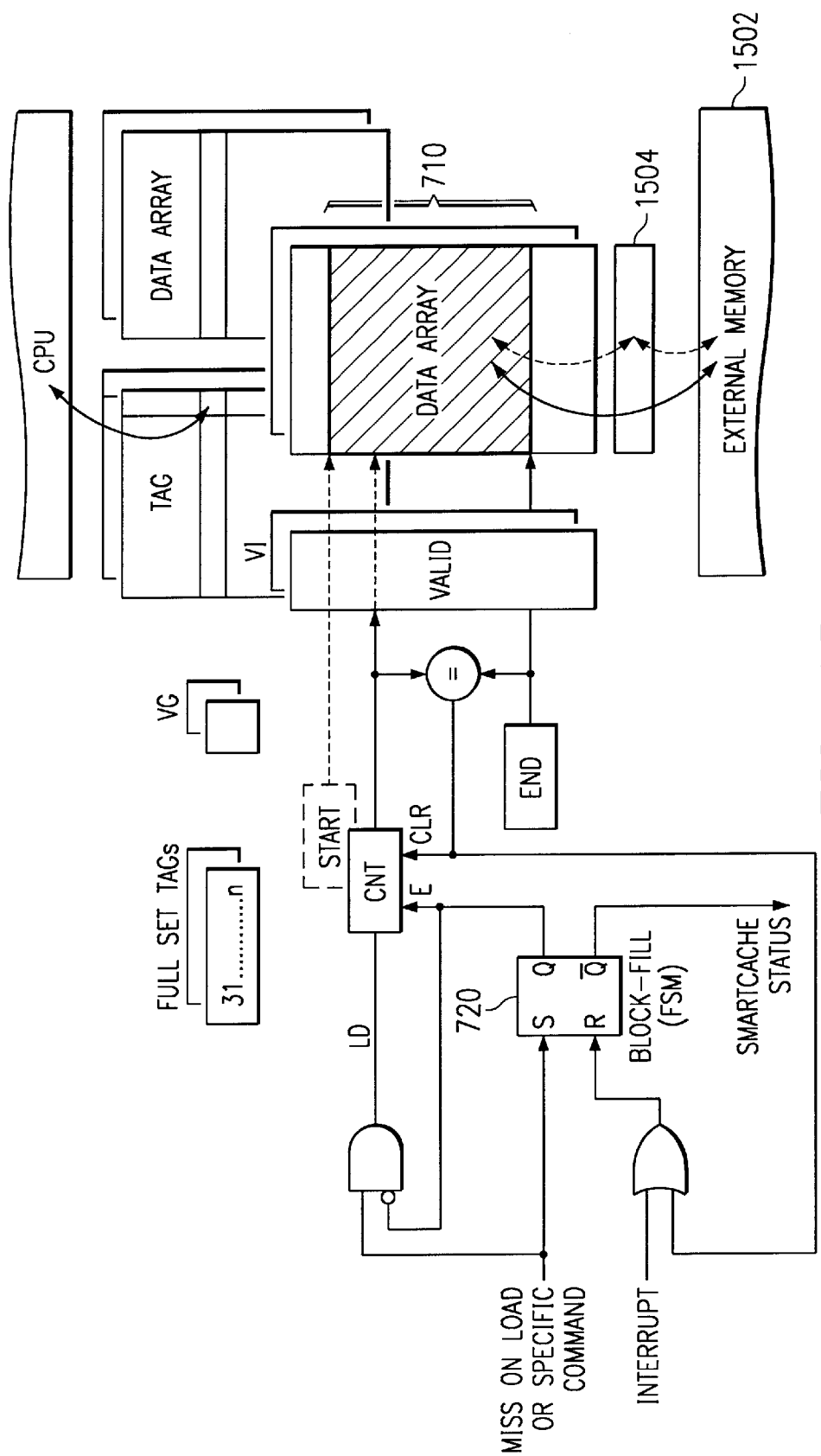
FIG. 15 is a block diagram of the cache of FIG. 7A illustrating data flow for interruptible block prefetch and clean functions in a RAM-set portion.

FIG. 15 is a block diagram of the level two (L2) cache of FIG. 7A illustrating data flow for interruptible block prefetch and clean functions. During a clean operation, a dirty line is first held in write buffer 1504 pending transfer to external memory 1502. Memory 1502 is representative of external memory 132 or on chip external memory 134 (FIG. 1). During a block load operation, a data line is transferred from external memory 1502 to data array 710 under control of FSM 720, as described earlier.

Figure 16:
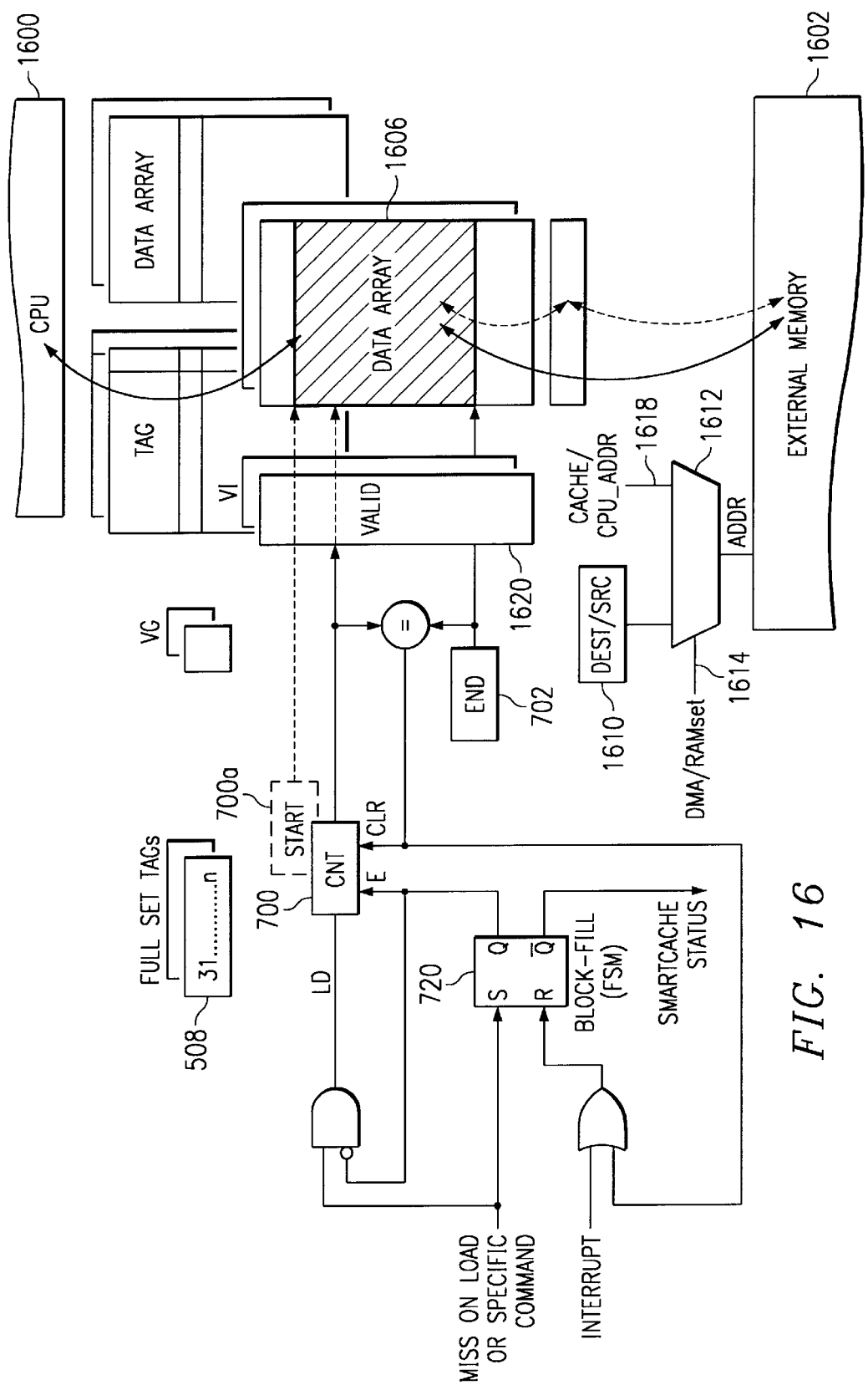
FIG. 16 is a block diagram of an alternative embodiment of the cache of FIG. 7A illustrating a source/destination register for DMA operation.

FIG. 16 is a block diagram of an alternative embodiment of the cache of FIG. 7A illustrating a source/destination register 1610 for direct memory access (DMA) operation. The RAM-set of the Configurable cache can be configured as a local memory with DMA support. DMA control circuitry is provided by cache hardware logic including FSM 720, start register 700 and end register 702. The Configurable cache commands are indifferently used in both modes. Multiplexor 1612 is controlled by mode signal 1614 to select dest/src register 1610 for providing addresses to external memory 1602 when in DMA mode. Source/destination register 1610 provides a destination/source address that enables re-allocation of data or instructions from an address space associated with data array 1606 to a different address space during transfer from/to external memory 1602. Likewise, multiplexor 1612 is controlled by mode signal 1614 to select cache address signals 1618 which are a concatenation of base-address register 508 and counter 700 for providing addresses to external memory 1602 when in RAM-set mode. In RAM-set mode, data array 1606 represents an address space for local storage of data or instructions from a same address space in external memory 1602. Mode signal 1614 is provided by a control register in control circuitry 530 (see FIG. 5A) that is controlled by software. Software can change the mode from DMA operation to non-DMA operation as needed.

Existing valid bits 1620 of the RAM-set are used to monitor the DMA progress, as discussed with respect to FIGS. 7A and 7B. This allows CPU 1600 to have access to the RAM-set concurrently with the DMA operation, including within the range of addresses that are being transferred by the DMA operation.

Thus, identical control for local memory working as a cache (RAM-set) or as a local memory with DMA is provided. In an alternative embodiment, separate DMA control logic may be provided instead of reusing cache control FSM 720, for example.

Figure 17:
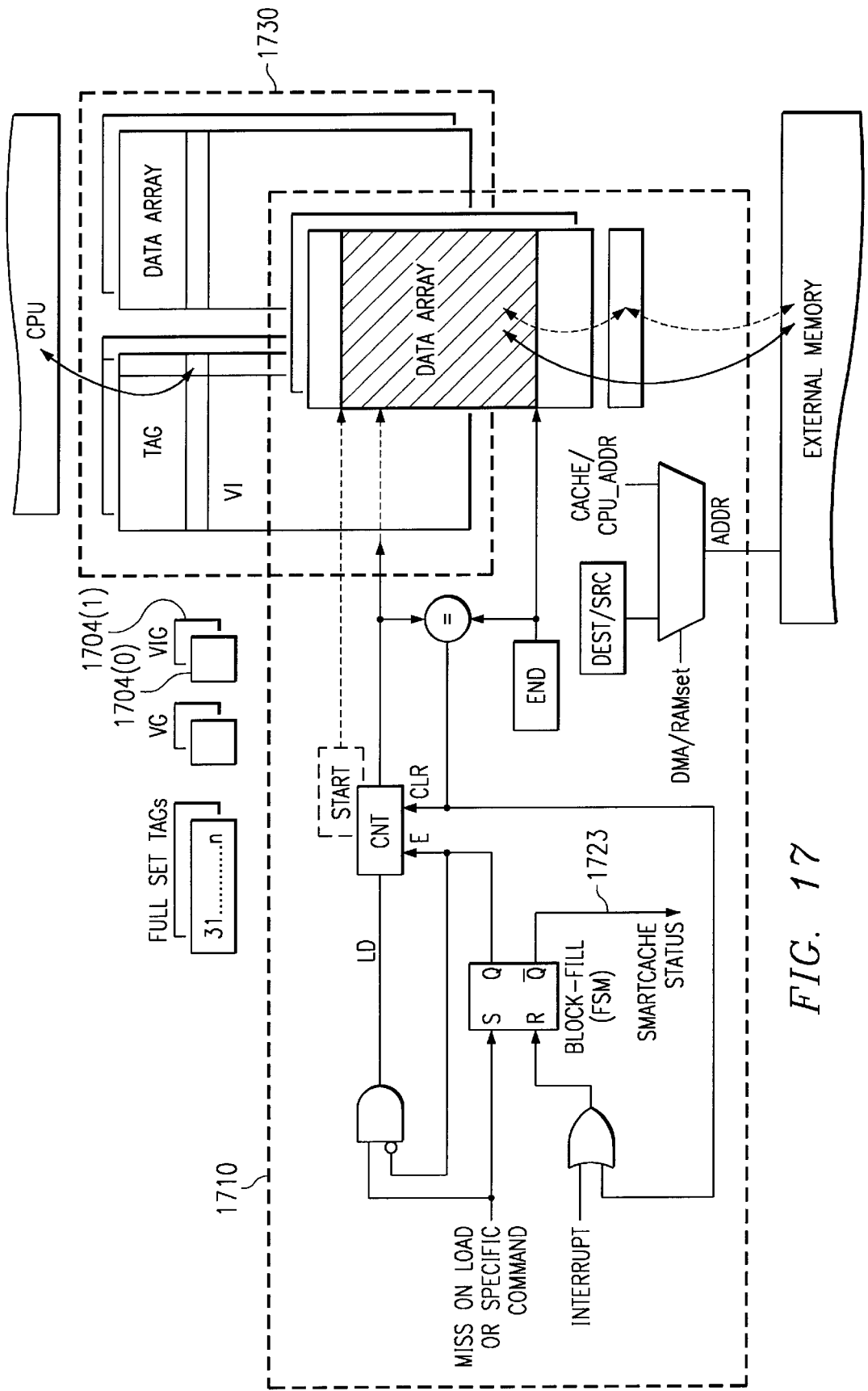
FIG. 17 illustrates an alternative embodiment of the cache of FIG. 16 using only a global valid bit for DMA completion status.

FIG. 17 illustrates an alternative embodiment of the cache of FIG. 16 using only a status bit 1723 for DMA completion status. RAM-set 1710 of the Configurable cache is configured as a local memory with DMA support provided by the cache hardware logic, as described with respect to FIG. 16.

In this embodiment, a single global individual valid bit VIG 1704(*n*) is provided for each RAM-set data array. In RAM-set mode, any access to the RAM-set when the VIG bit is off results in a miss. A resulting block prefetch will then assert the VIG bit after the entire block is loaded.

Progress of a DMA transfer is simply monitored by checking a status bit responsive to status signal 1723 to indicate completion of a DMA transfer. Status signal 1723 is connected to bit 31 of a SmartCache status register and is used to indicate when a block fill operation is in progress.

Thus, concurrent access on cache or on both cache 1730 and RAM-set 1710 are provided, except in the DMA range during DMA on RAM-set.

Figure 18:
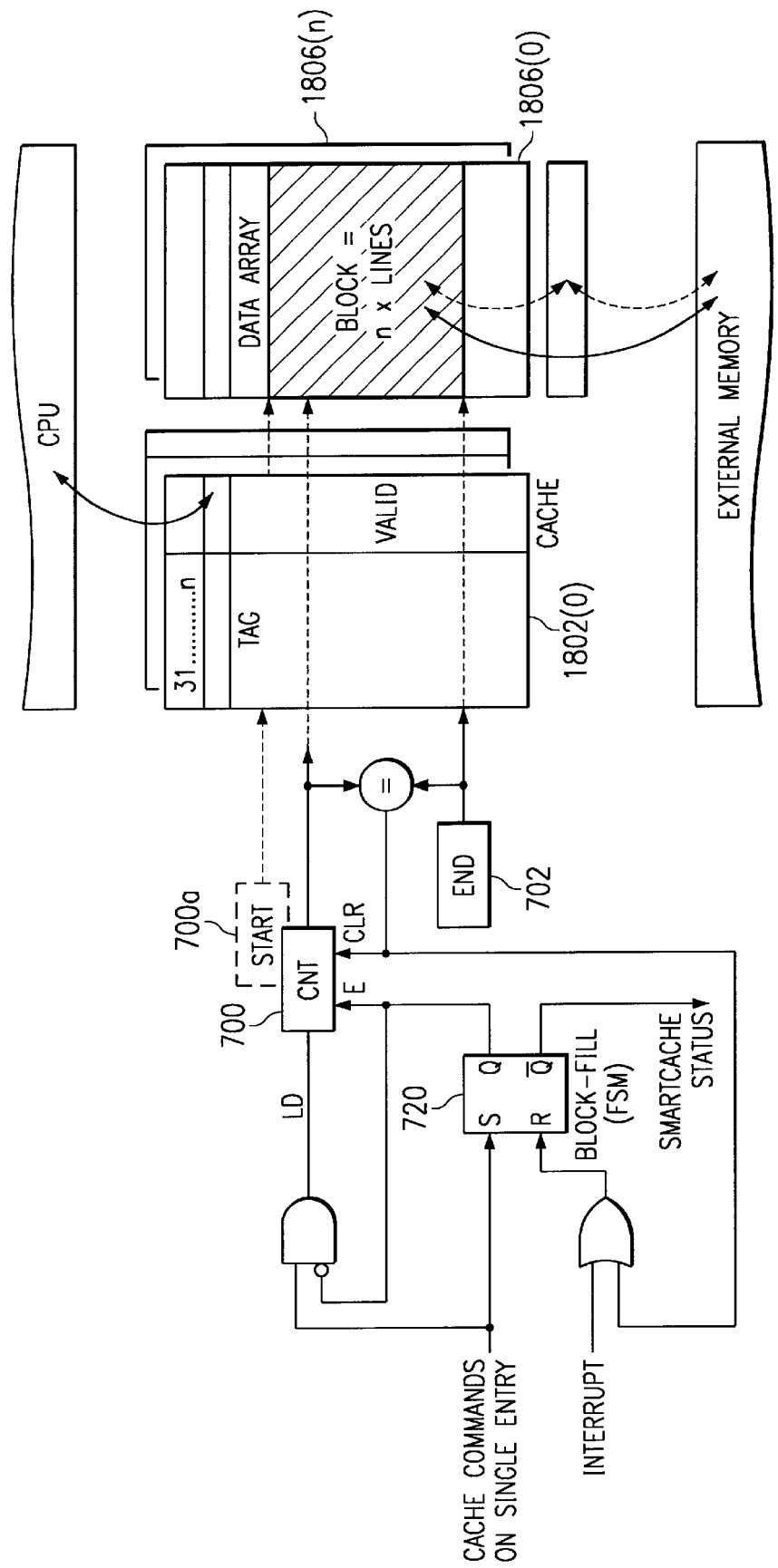
FIG. 18 illustrates operation of the cache of FIG. 5A in which a block of lines is cleaned or flushed in a set associate portion.

FIG. 18 illustrates operation of the cache of FIG. 5A in which a block of lines is cleaned or flushed. Programming register "end of block" 702 changes a cache operation such as clean or flush for a single specified entry to an operation on a block of lines located between this specified entry and the entry pointed by "end of block" register 702. The function can also be implemented using "end-of block" register 702 and start-of block register 700 to hold an initial value of the block counter. Finite state machine 720 controls the cache block flush and clean operations, as described previously with respect to FIGS. 7A and 7B for cleaning and flushing the RAM-set. In the present embodiment, the same FSM and address registers are used to control cache cleaning and RAM-set cleaning operations.

Thus, a cache clean and/or a cache flush operation can be performed on a range of addresses in response to a software directive.

In another embodiment, separate control circuitry can be provided for the cache and for the RAM-set. Alternatively, in another embodiment a RAM-set may not be included.

Figure 19:
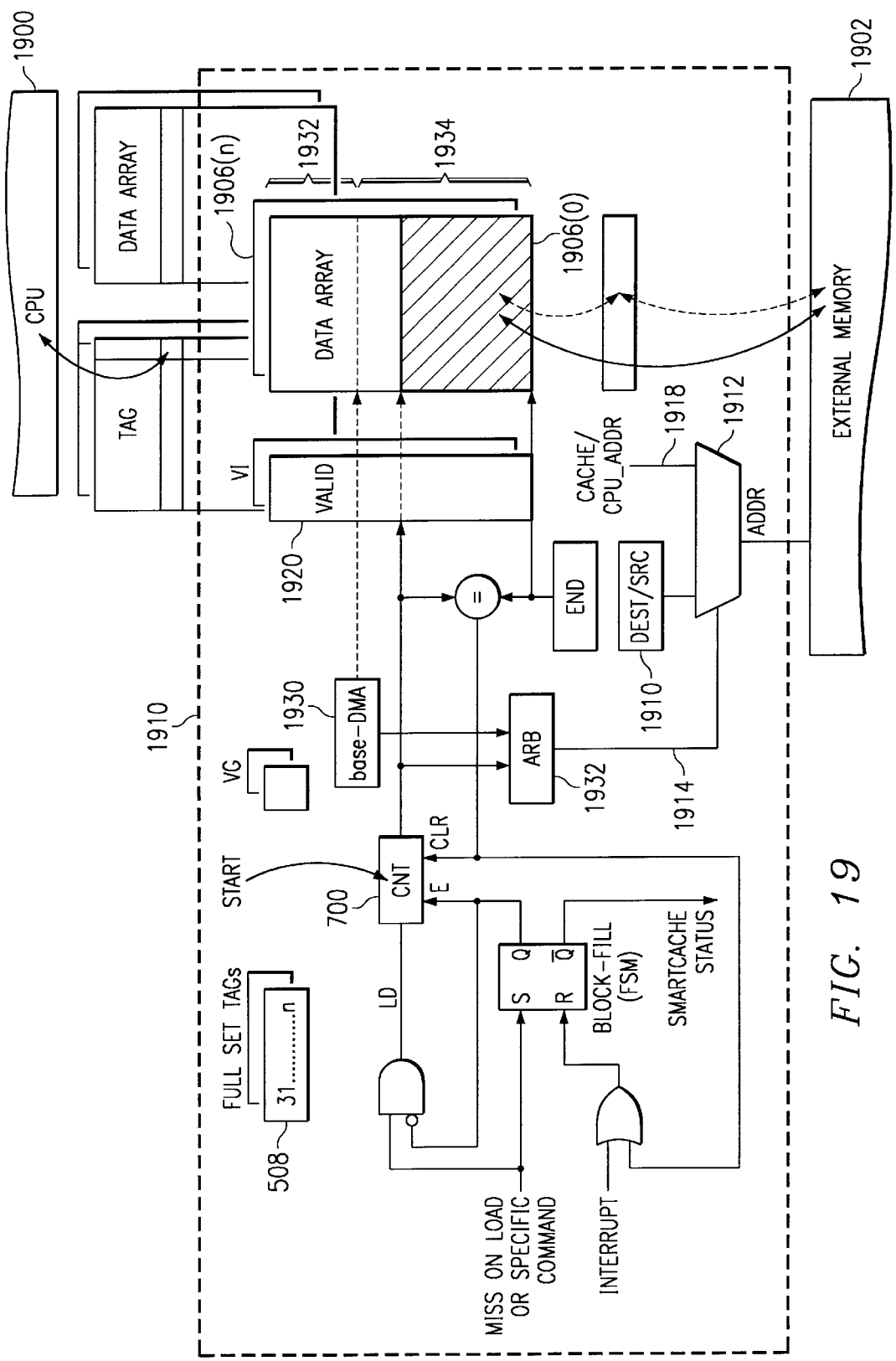
FIG. 19 illustrates an alternative embodiment of the cache of FIG. 16 having a DMA-base register and arbitration circuitry to support local memory with DMA operation simultaneously with RAM-set operation in the same RAM-set.

FIG. 19 illustrates an alternative embodiment of the cache of FIG. 16 having a DMA-base register 1930 and arbitration circuitry 1932 to support local memory with DMA operation simultaneously with RAM-set operation in the same RAM-set 1910. This allows a first portion 1932 of data array 1906(0) to operate as a RAM-set, as described earlier, and also allows a second portion 1934 to operate as a local memory with DMA type transfers. Base address register (base-DMA) 1930 indicates the beginning of the section of the RAM-set behaving as a local memory with DMA. As this is a working area, only one register is needed to split the RAM-set in two parts.

Multiplexor 1912 is controlled by mode signal 1914 to select dest/src register 1910 for providing addresses to external memory 1902 when signal 1914 is asserted. Mode signal 1914 is generated by arbitration circuitry 1932 in response to the current value of count register 700. Mode signal 1914 is asserted when count register 700 has a value that exceeds a value stored in base-DMA register 1930; otherwise signal 1914 is de-asserted.

Source/destination register 1910 provides a destination/source address that enables re-allocation of data or instructions from an address space associated with data array 1906 to a different address space during transfer from/to external memory 1902. Likewise, multiplexor 1912 is controlled by mode signal 1914 to select cache address signals 1918 which are a concatenation of base-address register 508 and counter 700 for providing addresses to external memory 1902 when signal 1914 is de-asserted. In RAM-set mode, data array 1906 represents an address space for local storage of data or instructions from a same address space in external memory 1902. Software can change the value stored in base-DMA register 1930 as needed.

Existing valid bits 1920 of the RAM-set are used to monitor the DMA progress, as discussed with respect to FIGS. 7A and 7B. This allows CPU 1900 to have access to the RAM-set concurrently with the DMA operation, including within a range of addresses that are being transferred by the DMA operation.

Figure 20:
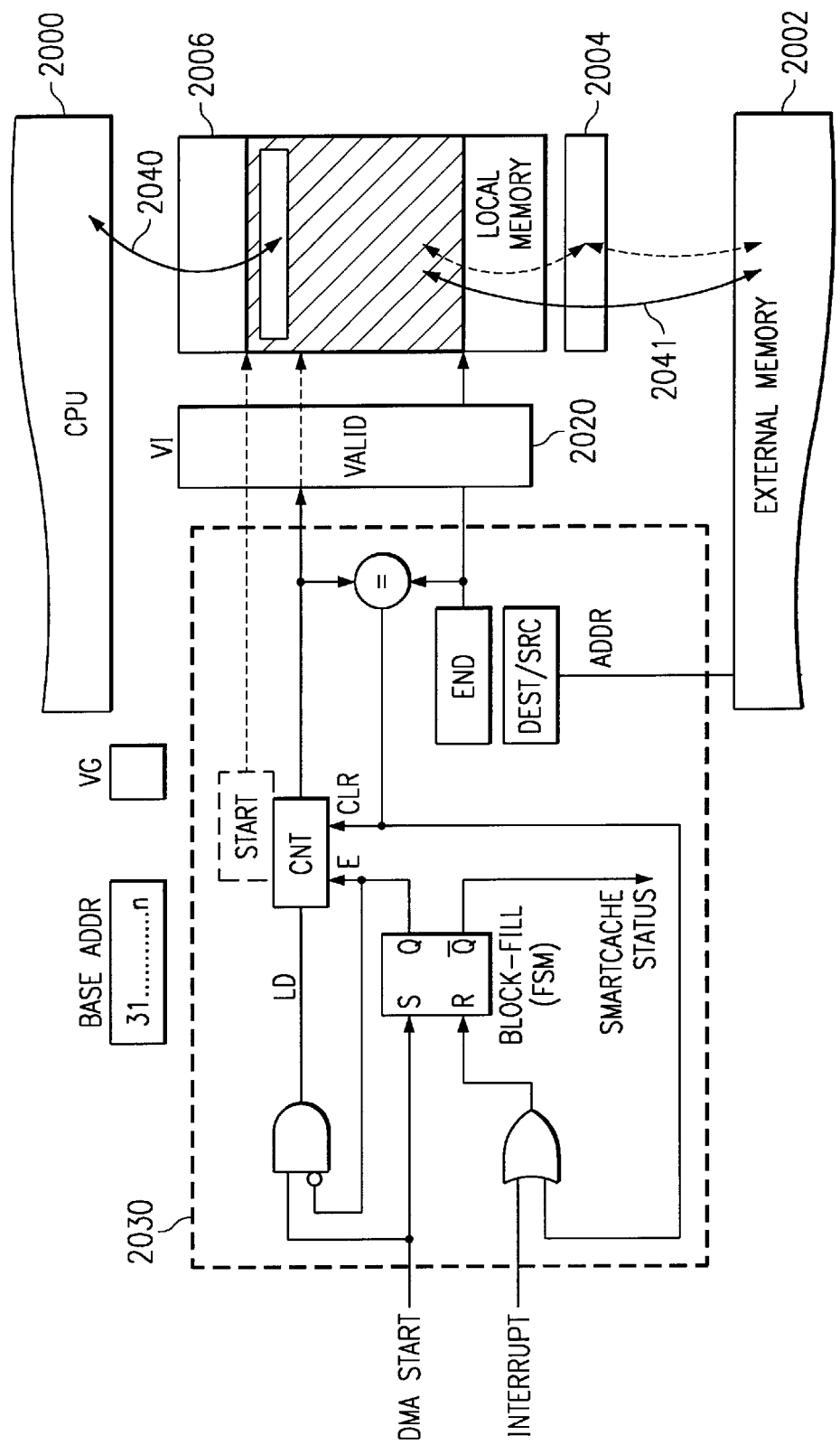
FIG. 20 illustrates an embodiment of a local memory that uses of a set of valid bits to support concurrent DMA and CPU access.

FIG. 20 illustrates an embodiment of a local memory 2006 that uses a set of valid bits 2020 to support concurrent CPU and DMA access, indicated at 2040. The local memory is segmented in line with individual valid bits enabling a CPU 2000 to access any line outside or inside the DMA range concurrently while the DMA transfer is on going. If a CPU is accessing a line ahead of the DMA, the DMA is momentary stalled to load the line accessed by the CPU and the DMA is then resumed. This operation is similar to the operation of a RAM-set as described with reference to FIG. 7A and FIG. 7B. Similar to the RAM-set operation described with respect to FIG. 7B, prior to loading each line, DMA engine 2030 checks a valid bit associated with that line from the set of valid bits 2020 to avoid overwriting a valid line, which would have been loaded ahead of the DMA execution in response to a CPU access.

Figure 21:
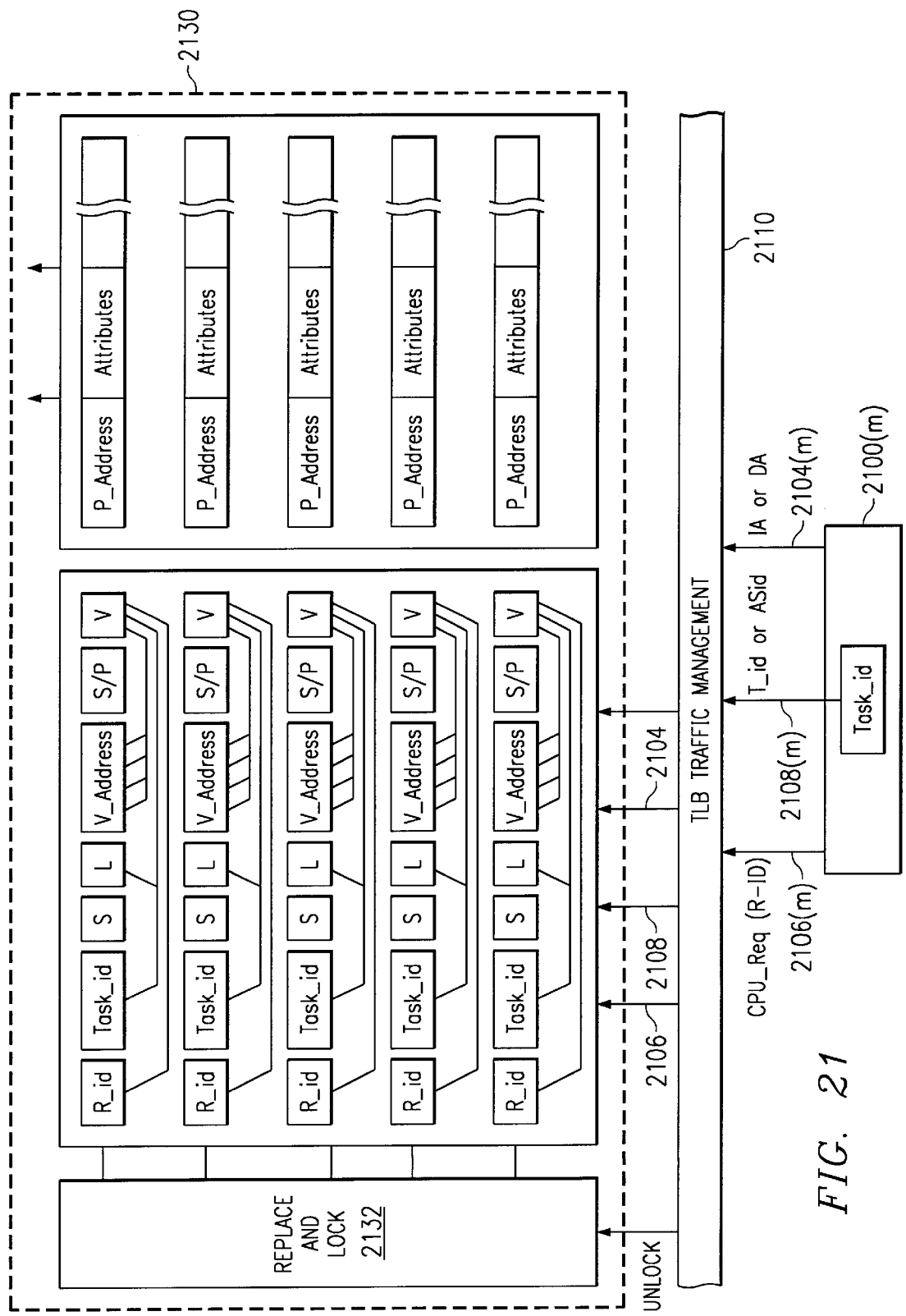
FIG. 21 illustrates operation of the TLB of FIG. 3 for selective flushing of an entry for a given task or resource.

FIG. 21 illustrates operation of the TLB of FIG. 3 for selective flushing of an entry for a given task or resource. A task-ID field (task-ID) and/or a "resource ID" field (R-ID) stored as independent fields in the TLB TAG array is used to selectively flush all entries of a given task or a given resource (requester). A state machine within control circuitry 2132 receives a directive from a processor to perform a flush operation, for example. The operation directive specifies which task-ID is to be flushed. The state machine then accesses each entry in TLB 2130, examines the task-ID field, and if there is a match that entry is flushed by marking its valid field (V) as not valid. Thus, a single operation is provided to flush all entries of a given task located in a TLB. In this embodiment, the TLB cache is made of several levels of TLB, and all levels are flushed simultaneously.

Processor 2100(n) is representative of one or more requestors that access TLB 300. A physical address bus 2104(n), resource ID signals 2106(n), and task ID signals 2108(n) are provided by each processor 2100(n) for each TLB request. Traffic controller 2110 provides request priority selection and sends the highest priority request to TLB 2130 using physical address bus 2104, resource ID signals 2106, and task ID signals 2108a to completely identify each request.

The TLB structure includes a field identifying the processing resource or memory accesses requestor (R_id). This "resource ID" field is part of the TLB TAG array to enable requestor-selective operations (such as flushes). This does, for instance, permit flushing all entries related to a processor that will be shutdown for energy savings.

Figure 22:
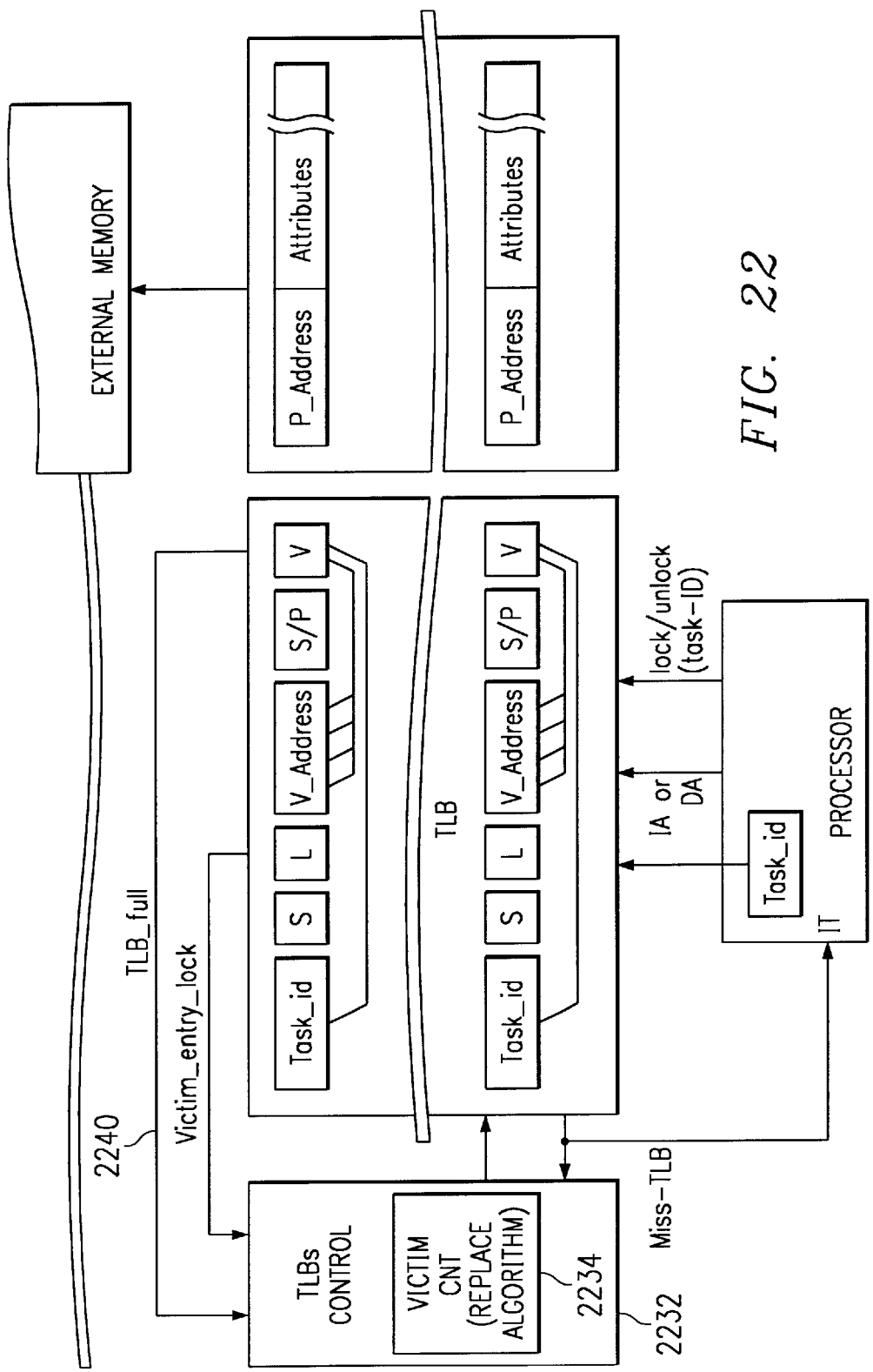
FIG. 22 illustrates control circuitry for adaptive replacement of TLB entries in the TLB of FIG. 3.

FIG. 22 illustrates control circuitry for adaptive replacement of TLB entries in the TLB of FIG. 3. In this multi-processor system with system shared TLB, the need has arisen to control the TLB on a task basis. The function "Lock/unlock all entries of a given task" is provided by the comparison of the task-id field in the TLB. If this field matches the supplied task-id, the associated Lock bit (L) of the matching entry is cleared. In the present embodiment of a TLB implemented with a RAM, the function is done through a hardware loop using finite state machine located in control circuitry 2232, for example. In an alternative embodiment of a TLB implemented with a content addressable memory (CAM), all entries with the same task-ID are unlocked in one cycle.

In order to support such a function in the most optimized way, an adaptive replacement algorithm taking into account locked entries and empty entries is provided. When the TLB is full, random replacement based on a simple counter (Victim CNT) 2234 is used to select the victim entry. On a miss, the lock bit of the victim entry is checked; if it is locked, the victim counter is incremented further in background of the table walk until a non-locked entry is found. When the TLB is not full, the victim counter is incremented further until an empty entry is found. After a flush entry, the victim "counter" is updated with the location value of the flush entry and stays unchanged until a new line is loaded in order to avoid unnecessary searching. The TLB full signal 2240 is asserted when all of the valid bits (V) are asserted.

A second implementation provides the capability to do the search instantaneously by providing in an external logic the lock and valid bit.

Thus, Lock/unlock operation on the TLB based on task-ID is provided. A Random Replacement algorithm for TLB is changed into cyclic on empty entry detection and lock victim entry detection.

Still referring to FIG. 22, the TLB TAG includes a one-bit-field (S) indicating if the corresponding address or page is shared or private. All entries marked as shared can be flushed in one cycle globally or within a task.

Figure 23:
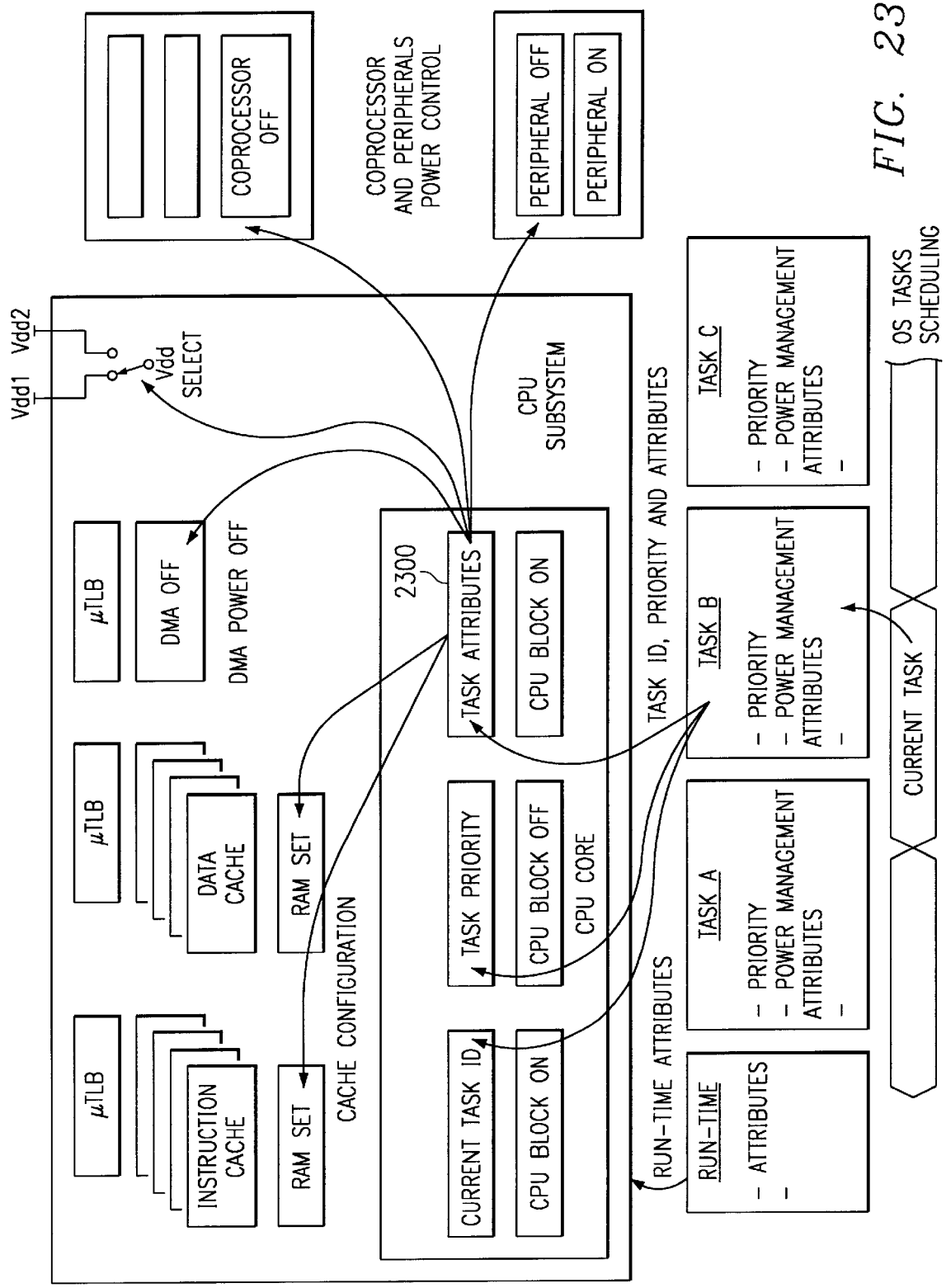
FIG. 23 is a block diagram of control circuitry in the megacell of FIG. 2 for dynamic control of power management systems using task attributes.

FIG. 23 is a block diagram of control circuitry in the megacell of FIG. 2 for dynamic control of power management systems using task attributes. A dynamic system power/energy management scheme based on hardware control via a run-time and task attributes register 2300 is provided. On a given processor, whenever a context switch occurs, the Operating System loads a current task ID register (Current Task ID), task priority and attribute register 2300. The attribute register contains a control bit for each major block of the CPU subsystem or the overall system. The supply voltage of each block can be defined according to the current task requirement. Some attributes can be also fixed at run-time. One or multiple power control registers can be loaded with power attributes by a processor each time this task is scheduled on this processor (task attributes), or each time a new scenario is built for the processor or the whole system (run-time attributes).

Figure 24:
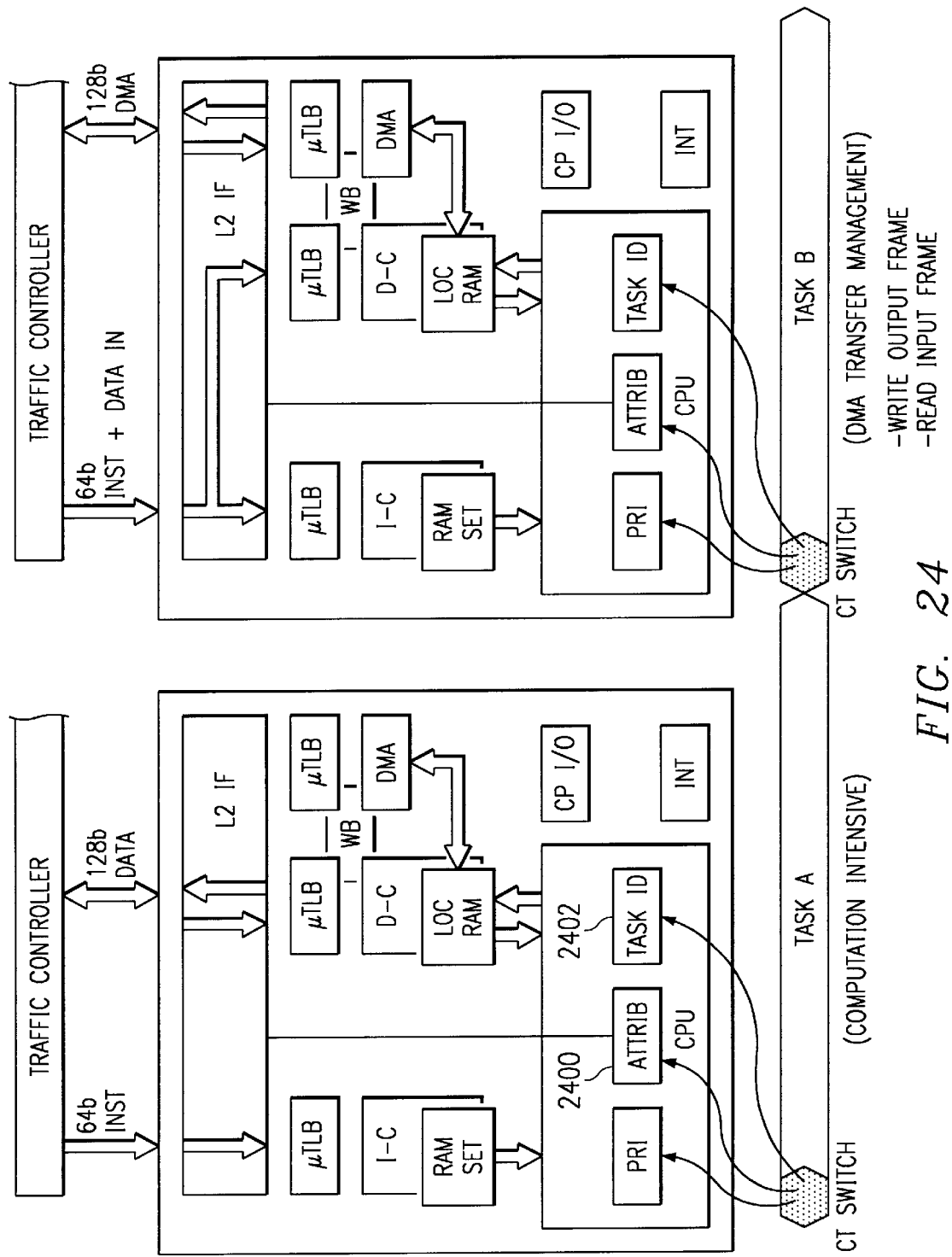
FIG. 24 illustrates dynamic hardware configuration of the megacell of FIG. 2 using task attributes.

FIG. 24 illustrates dynamic hardware configuration of the megacell of FIG. 2 using task attributes. A dynamic way to reconfigure a hardware logic module for a given task according to its resources requirements is provided in this embodiment. A configuration word(s) are written into an attribute register 2400, by a processor each time its operating system switches to a new task. Task register 2402 is similarly loaded. Register 2400 is a memory or a programmable control structure (FPLA), for example. This permits reuse of complex hardware logic for multiple functions, but also dynamically optimizes performance and energy consumption of this logic for a broader application range.

Figure 25:
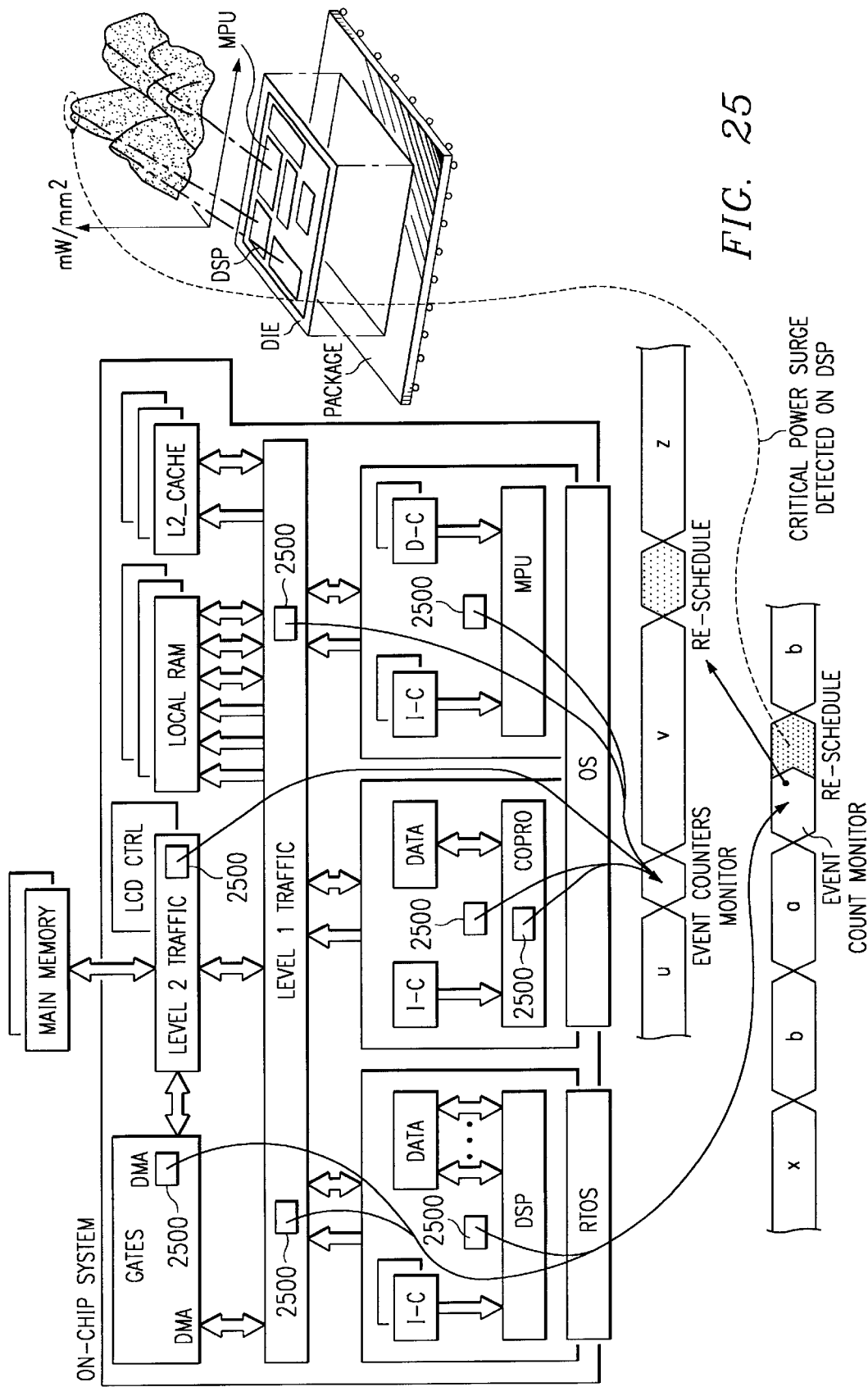
FIG. 25 illustrates task based event profiling to perform task scheduling for control of power dissipation within the system of FIG. 1.

FIG. 25 illustrates task based event profiling to perform task scheduling for control of power dissipation within the system of FIG. 1. A way to measure system energy consumed by a given task is provided. This measure is performed through a set of HW event counters 2500 triggered by a task ID. Each counter 2500 records activity associated with a specific region of the megacell that can be correlated with power consumption, such as signal transitions on a bus, for example. In order to profile a given task, the counters are enabled only when the given task is active, as indicated by the task ID register 2400 (see FIG. 24).

Digital System Embodiment

Figure 26A:
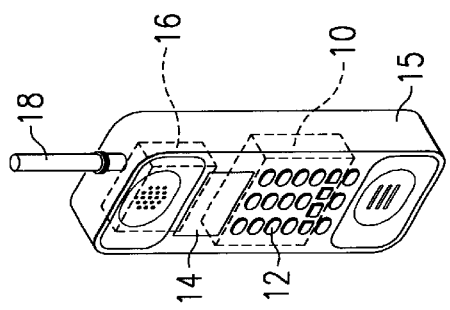
FIG. 26A is a representation of a telecommunications device incorporating an embodiment of the present invention.

FIG. 26A illustrates an exemplary implementation of an example of such an integrated circuit in a mobile telecommunications device, such as a mobile telephone with integrated keyboard 12 and display 14. As shown in FIG. 26, the digital system 10 with a megacell according to FIG. 2 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

It is contemplated, of course, that many other types of communications systems and computer systems may also benefit from the present invention, particularly those relying on battery power. Examples of such other computer systems include personal digital assistants (PDAs) portable computers, smart phones, web phones, and the like. As power dissipation is also of concern in desktop and line-powered computer systems and micro-controller application, particularly from a reliability standpoint, it is also contemplated that the present invention may also provide benefits to such line-powered systems.

Figure 26B:
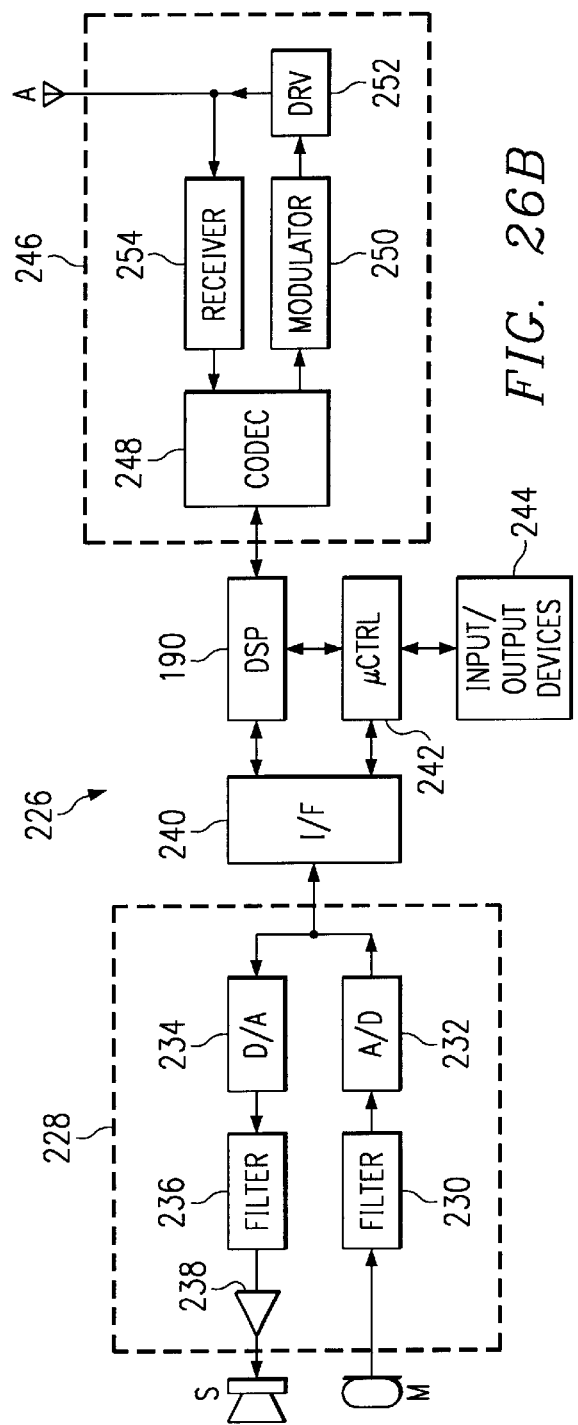
FIG. 26B is a block diagram representation of the telecommunications device of FIG. 26A.

FIG. 26B is a block diagram representation of the telecommunications device of FIG. 26A. Specifically, FIG. 26B illustrates the construction of a wireless communications system, namely a digital cellular telephone handset 226. It is contemplated, of course, that many other types of communications systems and computer systems may also benefit from the present invention, particularly those relying on battery power. Examples of such other computer systems include personal digital assistants (PDAS), portable computers, and the like. As power dissipation is also of concern in desktop and line-powered computer systems and micro-controller applications, particularly from a reliability standpoint, it is also contemplated that the present invention may also provide benefits to such line-powered systems.

Handset 226 includes microphone M for receiving audio input, and speaker S for outputting audible output, in the conventional manner. Microphone M and speaker S are connected to audio interface 228 which, in this example, converts received signals into digital form and vice versa. In this example, audio input received at microphone M is processed by filter 230 and analog-to-digital converter (ADC) 232. On the output side, digital signals are processed by digital-to-analog converter (DAC) 234 and filter 236, with the results applied to amplifier 238 for output at speaker S.

The output of ADC 232 and the input of DAC 234 in audio interface 228 are in communication with digital interface 240. Digital interface 240 is connected to micro-controller 242 and to digital signal processor (DSP) 190. Micro-controller 242 and DSP 190 are implemented in a megacell such as illustrated in FIG. 2 and includes the various aspects disclosed herein.

Micro-controller 242 controls the general operation of handset 226 in response to input/output devices 244, examples of which include a keypad or keyboard, a user display, and add-on cards such as a SIM card. Micro-controller 242 also manages other functions such as connection, radio resources, power source monitoring, and the like. In this regard, circuitry used in general operation of handset 226, such as voltage regulators, power sources, operational amplifiers, clock and timing circuitry, switches and the like are not illustrated in FIG. 26B for clarity; it is contemplated that those of ordinary skill in the art will readily understand the architecture of handset 226 from this description.

In handset 226, DSP 190 is connected on one side to interface 240 for communication of signals to and from audio interface 228 (and thus microphone M and speaker S), and on another side to radio frequency (RF) circuitry 246, which transmits and receives radio signals via antenna A. Conventional signal processing performed by DSP 190 may include speech coding and decoding, error correction, channel coding and decoding, equalization, demodulation, encryption, voice dialing, echo cancellation, and other similar functions to be performed by handset 190.

RF circuitry 246 bidirectionally communicates signals between antenna A and DSP 190. For transmission, RF circuitry 246 includes codec 248 that codes the digital signals into the appropriate form for application to modulator 250. Modulator 250, in combination with synthesizer circuitry (not shown), generates modulated signals corresponding to the coded digital audio signals; driver 252 amplifies the modulated signals and transmits the same via antenna A. Receipt of signals from antenna A is effected by receiver 254, which applies the received signals to codec 248 for decoding into digital form, application to DSP 190, and eventual communication, via audio interface 228, to speaker S.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, the L2 cache may be a simple cache that does not include RAM-set or configurable features while still providing qualifier fields for cache operation commands. The cache may be positioned at a level other than L2. The cache may have a different set organization with a different number of segments per line, for example. The cache may have other than two qualifier fields in each tag entry.

It is therefore contemplated that the appended claims will cover any such modifications of the embodiments as fall within the true scope and spirit of the invention.

What is claimed is:

1. A digital system comprising:
   a plurality of processors;
   a plurality of private level one (L1) caches, each associated with a respective one of the plurality of processors;
   a shared level two (L2) cache having a plurality of segments per entry connected to transfer a data segment to each private L1 cache;
   a level three (L3) physical memory connected to provide a plurality of data segments to the shared L2 cache, wherein the shared L2 cache is operable to request transfer of a first plurality of segments in response to a first miss in a first private L1 cache; and
   wherein the shared L2 cache is operable to stop transferring the first plurality of segments and to start transferring a second plurality of segments in response to a second miss in a second private L1 cache.

2. The digital system of claim 1, wherein the shared L2 cache comprises a plurality of tag entries, wherein each tag entry has a resource ID field.

3. The digital system according to claim 2, wherein each tag entry has a task ID field.

4. The digital system according to claim 3, further comprising a shared translation lookaside buffer (TLB), wherein the TLB has a plurality of page entries, and wherein each page entry has a resource ID field.

5. The digital system according to claim 4, wherein each page entry has a task ID field.

6. The digital system of claim 1, wherein each entry in said L2 cache comprises a predetermined number of segments and wherein each segment in an entry has a respective valid bit.

7. The digital system of claim 6, wherein the first plurality of segments comprises an entry in said L2 cache and the valid bit for each of said first plurality of segments is set to a predetermined value when the segment is stored in the L2 cache.

8. The digital system of claim 1 wherein the L3 cache transfers the first plurality of segments starting at a first segment associated with a first address which caused the first miss, wherein the first segment is transferred to both the L2 cache and first processor associated with the first private L1 cache, such that the second miss does not delay the receipt of the first segment by the first processor.

9. A digital system comprising:

a plurality of processors;

a plurality of private level one (L1) caches, each associated with a respective one of the plurality of processors;

a shared level two (L2) cache having a plurality of segments per entry connected to transfer a data segment to each private L1 cache, where the L2 cache includes a portion that is configurable as a RAM-set, and wherein the RAM-set is operable to load a block of segments in an interruptible manner;

a level three (L3) physical memory connected to provide a plurality of data segments to the shared L2 cache, wherein the shared L2 cache is operable to request transfer of a first plurality of segments in response to a first miss in a first private L1 cache; and wherein the shared L2 cache is operable to stop transferring the first plurality of segments and to start transferring a second plurality of segments in response to a second miss in a second private L1 cache.

10. The digital system according to claim 9, wherein the shared L2 cache comprises control circuitry that can be configured to operate in DMA mode.

11. A digital system comprising:

a plurality of processors;

a plurality of private level one (L1) caches, each associated with a respective one of the plurality of processors;

a shared level two (L2) cache having a plurality of segments per entry connected to transfer a data segment to each private L1 cache;

a level three (L3) physical memory connected to provide a plurality of data segments to the shared L2 cache, wherein the shared L2 cache is operable to request transfer of a first plurality of segments in response to a first miss in a first private L1 cache;

wherein the shared L2 cache is operable to stop transferring the first plurality of segments and to start transferring a second plurality of segments in response to a second miss in a second private L1 cache; and a shared translation lookaside buffer (TLB), wherein the TLB has a plurality of page entries, and wherein each page entry has a resource ID field and a endianness field.

12. A digital system comprising:

a plurality of processors;

a plurality of private level one (L1) caches, each associated with a respective one of the plurality of processors;

a shared level two (L2) cache having a plurality of segments per entry connected to transfer a data segment to each private L1 cache;

a level three (L3) physical memory connected to provide a plurality of data segments to the shared L2 cache, wherein the shared L2 cache is operable to request transfer of a first plurality of segments in response to a first miss in a first private L1 cache;

wherein the shared L2 cache is operable to stop transferring the first plurality of segments and to start transferring a second plurality of segments in response to a second miss in a second private L1 cache; and configuration circuitry associated with at least a first one of the plurality of processors, wherein the configuration circuitry is responsive to a task ID value to select an operating parameter for the first processor.

13. A cellular telephone comprising:

a plurality of processors;

a plurality of private level one (L1) caches, each associated with a respective one of the plurality of processors;

a shared level two (L2) cache having a plurality of segments per entry connected to transfer a data segment to each private L1 cache;

a level three (L3) physical memory connected to provide a plurality of data segments to the shared L2 cache, wherein the shared L2 cache is operable to request transfer of a first plurality of segments in response to a first miss in a first private L1 cache;

wherein the shared L2 cache is operable to stop transferring the first plurality of segments and to start transferring a second plurality of segments in response to a second miss in a second private L1 cache;

an integrated keyboard connected to at least one of the microprocessors via a keyboard adapter;

a display, connected to at least one of microprocessors via a display adapter;

radio frequency (RF) circuitry connected to at least one of the microprocessors; and an aerial connected to the RF circuitry.

* * * * *